(12) United States Patent
Kondo et al.

(10) Patent No.: US 6,522,245 B1
(45) Date of Patent: Feb. 18, 2003

(54) COMPOSITE DEVICE FOR VEHICLE

(75) Inventors: Shinji Kondo, Nagoya (JP); Naoyuki Aoki, Kariya (JP); Tatsuya Seto, Kariya (JP); Tomoyuki Miyagawa, Kota-cho (JP); Takanobu Sasaki, Anjo (JP); Shingo Kuwamura, Chiryu (JP); Yasuhiro Yamada, Okazaki (JP); Keiichi Kurokawa, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/805,783

(22) PCT Filed: Sep. 29, 1999

(86) PCT No.: PCT/JP99/05351

§ 371 (c)(1),
(2), (4) Date: Apr. 27, 2001

(87) PCT Pub. No.: WO00/18615

PCT Pub. Date: Apr. 6, 2000

(30) Foreign Application Priority Data

Sep. 29, 1998 (JP) .............................. 10-276086
Sep. 10, 1999 (JP) .............................. 11-257690

(51) Int. Cl.$^7$ ................................................ B60A 1/00
(52) U.S. Cl. ...................... 340/436; 340/435; 340/901; 701/301
(58) Field of Search ................................ 340/436, 901, 340/903, 437, 435; 701/301

(56) References Cited

U.S. PATENT DOCUMENTS 5,091,726 A * 2/1992 Shyu ........................... 340/904
5,598,164 A * 1/1997 Reppas et al. ................. 342/70
6,091,323 A * 7/2000 Kawai .......................... 340/435
6,281,786 B1 * 8/2001 Adachi et al. ............... 340/435
6,433,679 B1 * 8/2002 Schmid ......................... 34/435
6,289,332 B2 * 9/2002 Menig et al. ................... 701/1

FOREIGN PATENT DOCUMENTS

| JP | 55-134349 | 11/1980 |
|----|-----------|---------|
| JP | 55-179942 | 12/1980 |
| JP | 57-128868 | 8/1982 |
| JP | 59-230848 | 12/1984 |
| JP | 60-249077 | 12/1985 |
| JP | 62-99224 | 5/1987 |
| JP | 62-170581 | 10/1987 |
| JP | 63-206681 | 8/1988 |
| JP | 63-208783 | 8/1988 |
| JP | 63-208784 | 8/1988 |
| JP | 2-123431 | 10/1990 |
| JP | 9-5120 | 1/1997 |

* cited by examiner

Primary Examiner—Julie Lieu
(74) Attorney, Agent, or Firm—Law Offices of David G. Posz

(57) ABSTRACT

The object of the present invention is to provide a composite apparatus in which a meter for a vehicle and an obstacle alarm device for a vehicle share a constituting means common to the meter and the obstacle alarm device. The meter and the obstacle alarm device share a buzzer-driving circuit (40) of and a buzzer (50).

8 Claims, 19 Drawing Sheets

(a)

(b)

(c)

COMPOSITE DEVICE FOR VEHICLE

TECHNICAL FIELD

The present invention relates to a composite apparatus in which a meter for a vehicle and an obstacle alarm device for a vehicle share a constituting means common to the meter and the obstacle alarm device.

BACKGROUND ART

Conventionally, a meter and an obstacle alarm device mounted on a vehicle have an independent circuit construction.

The meter and the obstacle alarm device both have similar circuits. For example, an alarm can be activated while moving the vehicle rearward by switching the speed-change range of an automatic speed-change gear thereof to a reverse range and providing the meter with a buzzer. To give an alarm about an obstacle present rearward from the vehicle in moving the vehicle rearward, the obstacle alarm device is provided with a buzzer. Accordingly, the buzzer and the obstacle alarm device are common in their circuit constructions in that both the meter and the obstacle alarm device are provided with a buzzer.

The meter is provided with an indicator to display a travel distance of the vehicle. Depending on a vehicle, the obstacle alarm device is provided with an indicator to sound an alarm that an obstacle is present when the vehicle moves rearward. Accordingly, the buzzer and the obstacle alarm device are common in their circuit constructions in that both the meter and the obstacle alarm device are provided with an indicator.

The meter and the obstacle alarm device are similar because both the meter and the obstacle alarm device have an electric power supply, an interface circuit, and a microcomputer.

The conventional design in which the obstacle alarm device and the meter have a similar circuit is wasteful, uses a high amount of space, and is costly.

DISCLOSURE OF THE INVENTION

To deal with the above-described problem, it is an object of the present invention to provide a composite apparatus in which a meter for a vehicle and an obstacle alarm device for a vehicle share a constituting means common to the meter and the obstacle alarm device.

To solve the above-described problem, there is provided a composite apparatus for a vehicle including a meter (10, 10*a*, 60, 70, 80, 90) and an obstacle alarm device (20, 21, 30, 30*a*, 240, 240*a*) combined with the meter in such a way that the meter and the obstacle alarm device share constituting means (10, 20, 20A, 40, 50, 91, 92, 220, 220*a*, 230, 230*b*) constituting a part of the meter.

Because the meter and the obstacle alarm device share a part of the constituting means of the meter, it is unnecessary to provide the obstacle alarm device with constituting means similar to that of the meter. Consequently, the constituting elements are not used wastefully and thus space-saving and cost reduction can be achieved.

The constituting means is at least one of a power source means (220, 220*a*), an interface means (230 through 230*b*), a control means (10, 20, 20A), an informing means (91, 92). Thereby, it is possible to achieve the operation and effect of the present invention.

The informing means may be a sounding means (40, 50).

In this case, the composite apparatus includes a vehicle speed detection means (130) for detecting a speed of the vehicle and inputting data of a detected vehicle speed to the interface means; and a reverse range detection means (142) for detecting a reverse range of a speed-change gear mounted on the vehicle and inputting data of a detected reverse range to the interface means. The obstacle alarm device has an obstacle detection means (30) for detecting an approach of a rear part of the vehicle to an obstacle present rearward from the rear part of the vehicle. Upon receipt of an electric power from the power source means, the control means sounds the sounding means, according to an output of the detected vehicle speed sent thereto from the interface means and according to one of the output of the detected vehicle speed sent thereto from the interface means and an output of the detected result sent thereto from the obstacle detection means.

Thereby, because the meter and obstacle alarm device share the sounding means, the sounding means gives a normal alarm in a rearward movement of the vehicle by switching the speed-change range of the automatic speed-change gear to the reverse range and also gives an alarm about an approach of the vehicle to the obstacle in a rearward movement of the vehicle.

The informing means may be a display means (91, 92).

In this case, the composite apparatus for a vehicle includes a vehicle speed detection means (130) for detecting a speed of the vehicle and inputting data of a detected vehicle speed to the interface means; and a travel range detection means (142, 144, 145, 146) for detecting a travel range of a speed-change gear mounted on the vehicle and inputting data of a detected travel range to the interface means. The obstacle alarm device has an obstacle detection means (30, 30*a*) for detecting an approach of the vehicle to an obstacle. The display means is a travel distance display means (90). Upon receipt of an electric power from the power source means, the control means issues an instruction of displaying a travel distance of the vehicle to the travel distance display means, according to an output of the detected vehicle speed sent thereto from the interface means; and issues an instruction of displaying an approach of the vehicle to the obstacle to the travel distance display means, according to an output of the detected vehicle speed sent thereto from the interface means and according to an output of the detected result sent thereto from the obstacle detection means.

Thereby, because the meter and obstacle alarm device share the travel distance display means, the travel distance display means displays a travel distance in traveling the vehicle by switching the speed-change range of the automatic speed-change gear to the travel range. The travel distance display means also makes an alarm display about an approach of the vehicle to an obstacle.

BEST MODE FOR CARRYING OUT THE INVENTION

The embodiments of the present invention will be described with reference to the drawings.

FIRST EMBODIMENT

Figure 1:
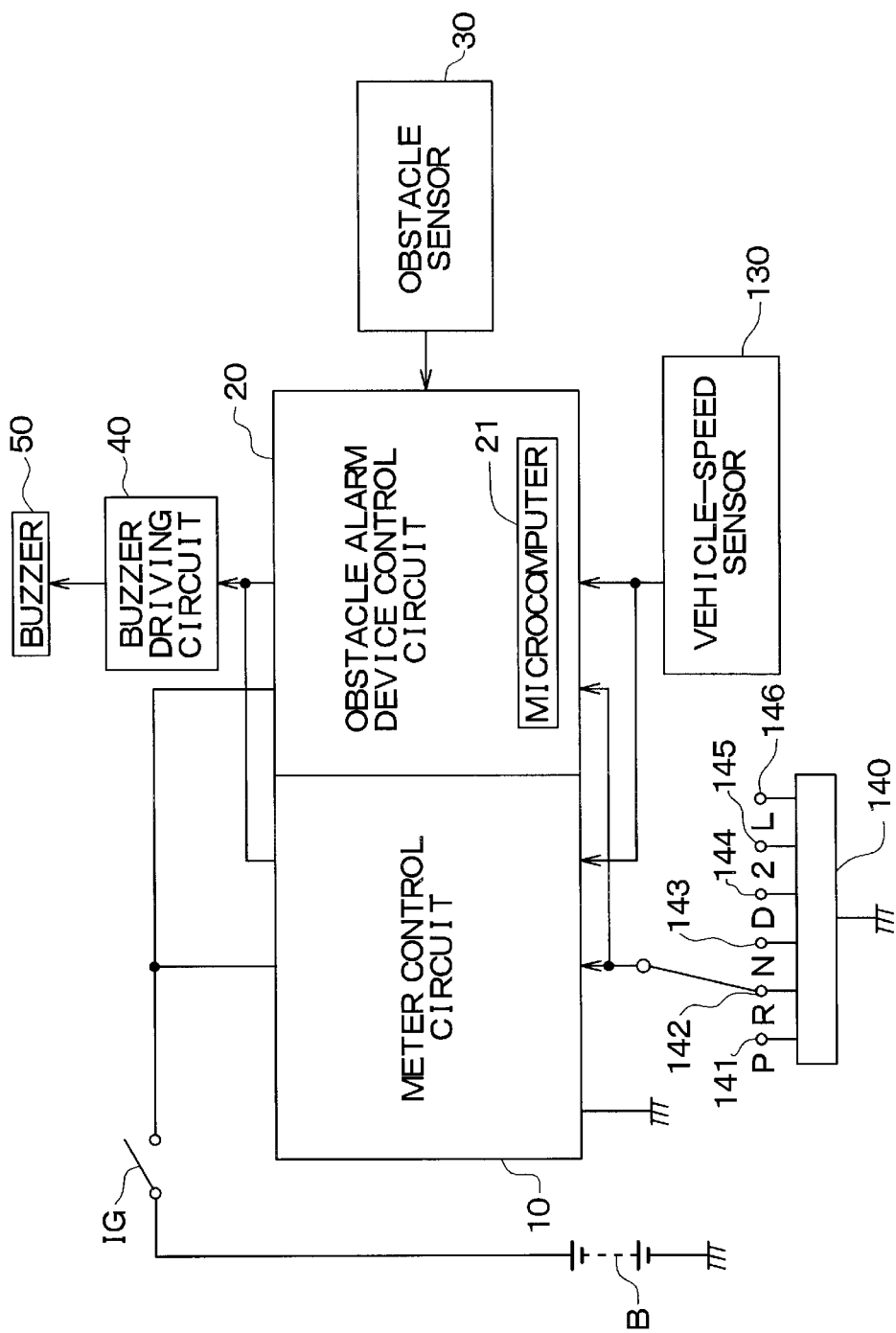
FIG. 1 is a block diagram showing a first embodiment of the present invention.
Figure 2:
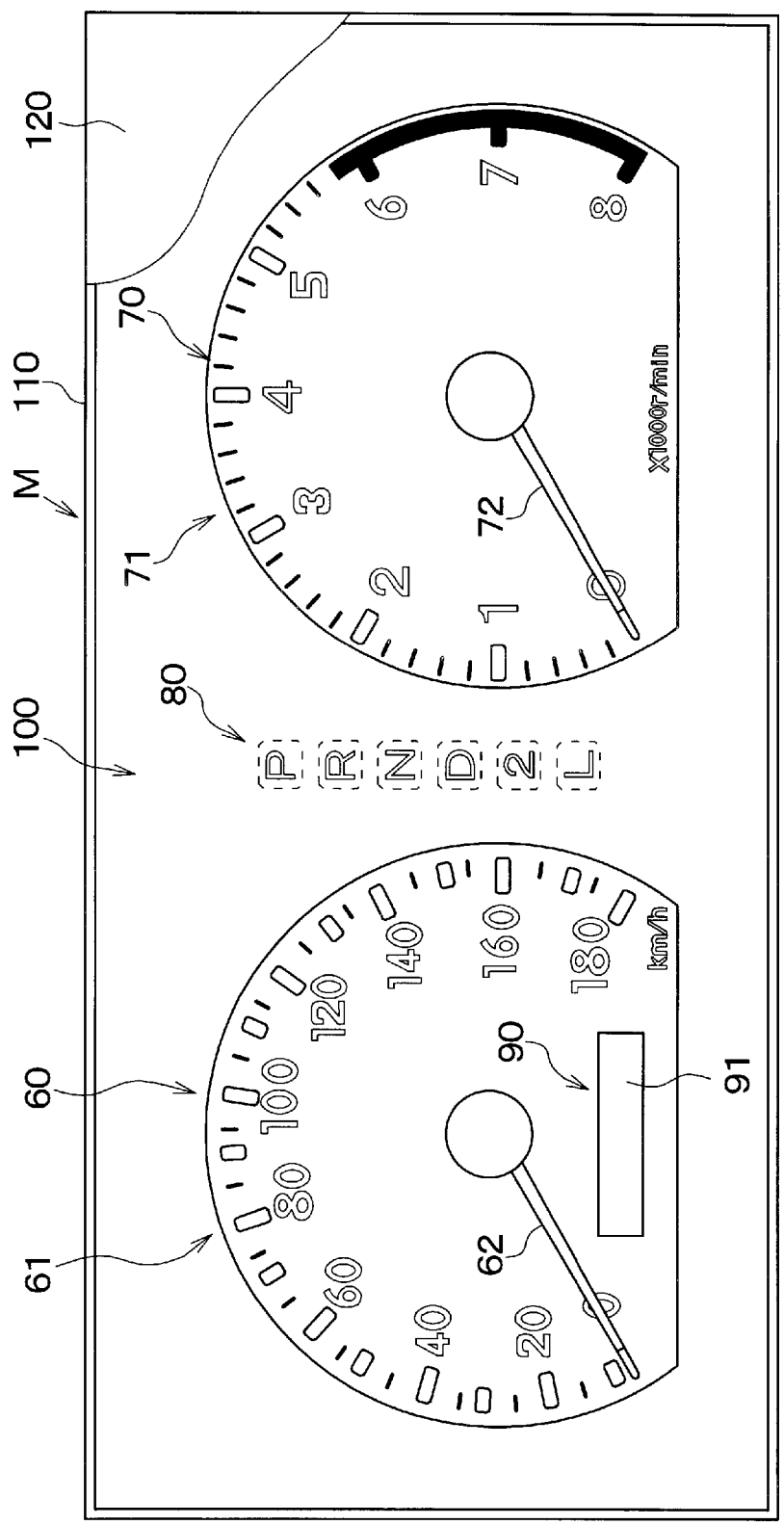
FIG. 2 is a partly-broken-away front view showing a meter according to the first embodiment.

FIGS. 1 and 2 show an embodiment of the composite apparatus in which a meter and an obstacle alarm device share a constituting means common to the meter and the obstacle alarm device.

The composite apparatus is constructed of a meter body M consisting of a meter, a meter control circuit 10, an obstacle alarm device control circuit 20 consisting of an obstacle alarm device, an obstacle sensor 30, a buzzer driving circuit 40 common to the meter and the obstacle alarm device, and a buzzer 50.

As shown in FIG. 2, the meter body M has a speed meter 60, a tachometer 70, an indicator 80, and an odo-trip meter 90. The speed meter 60 indicates the speed of a vehicle with a pointer 62 pivoting along a graduated scale 61 provided in an open portion of a dial 100. The pointer 62 is driven by a driving portion provided on a rear surface of the dial 100.

The tachometer 70 indicates the number of rotations of the engine of the vehicle with a pointer 72 pivoting along a graduated scale 71 provided in the open portion of the dial 100. The pointer 72 is driven by the driving portion provided on the rear surface of the dial 100.

The indicator 80 indicates speed-change ranges of an automatic speed-change gear of the vehicle. The speed-change ranges of the automatic speed-change gear, namely, a parking range, a reverse range, a neutral range, a drive range, a two-speed range, and a low range are displayed with "P", "R", "N", "D", "2", and "L", respectively. The speed-change ranges are displayed by lighting of each lamp provided on the rear surface of the dial 100.

In the odo-trip meter 90, both a total travel distance and a section travel distance or one of the total travel distance and the section travel distance are displayed on a liquid crystal panel 91 mounted on the rear surface of an open portion of the graduated scale 61. Driven by a liquid crystal panel driving circuit, a display is made on the liquid crystal panel 91. Reference numerals 110 and 120 in FIG. 2 denote a back plate and a front panel, respectively.

The meter control circuit 10 includes a driving portion of the speed meter 60, a driving portion of the tachometer 70, each lamp of the indicator 80, and a liquid crystal panel-driving circuit of the odo-trip meter 90. Based on an output of a vehicle-speed sensor 130, the meter control circuit 10 controls the driving portion of each of the speed meter 60 and the tachometer 70. Based on turn-on of any one of a plurality of speed-change switches 141 through 146 of a speed change switching mechanism 140, the meter control circuit 10 also controls lighting of each lamp of the indicator 80.

The vehicle-speed sensor 130 detects a speed of the vehicle. The speed-change switches 141 through 146 are turned on when the speed-change ranges of the automatic speed-change gear are placed in the parking range, the reverse range, the neutral range, the drive range, the two-speed range, and the low range, respectively. Reference symbol IG of FIG. 1 denotes an ignition switch of the vehicle, and B denotes a battery.

When the speed-change switch 142 is ON, to give an alarm of a rearward movement of the vehicle, the meter control circuit 10 sounds the buzzer 50 through the buzzer driving circuit 40.

Under the control of a microcomputer 21 provided in the obstacle alarm device control circuit 20, when the speed-change switch 142 is ON, the obstacle alarm device control circuit 20 sounds the buzzer 50 through the buzzer driving circuit 40 to give an alarm that an obstacle is located in a left rear part or a right rear part of the vehicle, according to an output of the vehicle-speed sensor 130 and that of each obstacle sensor 30.

Figure 3:
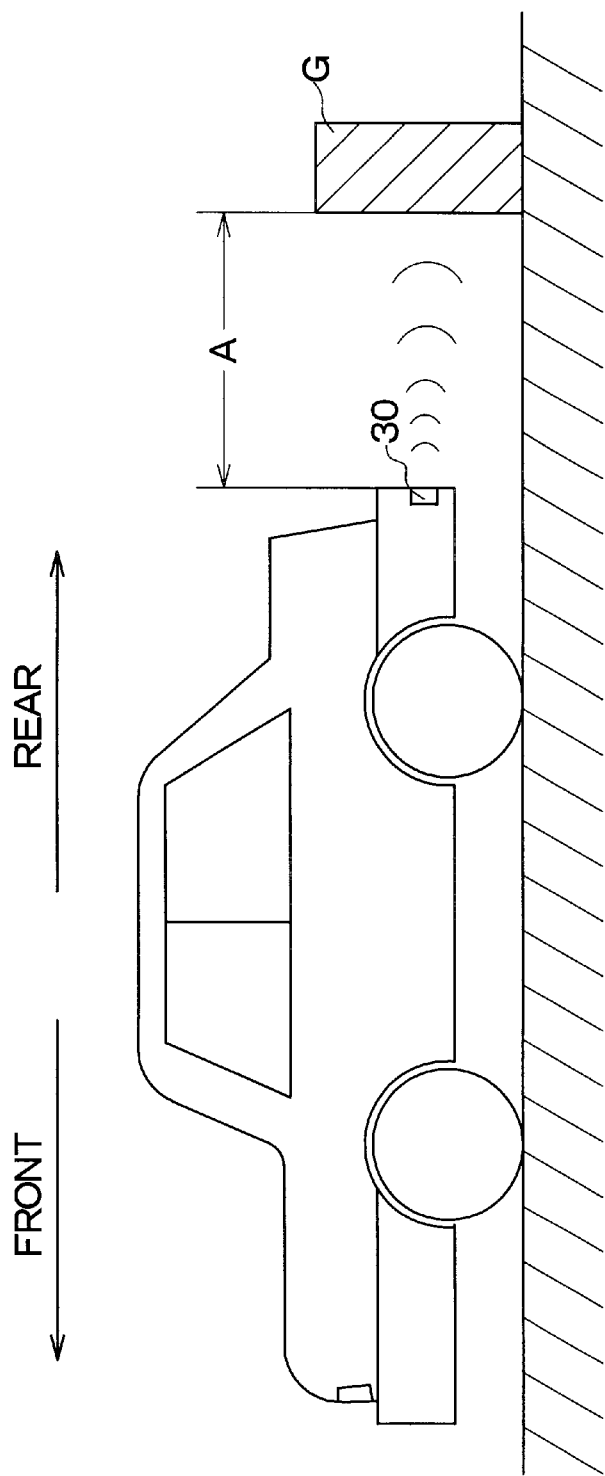
FIG. 3 is a side view showing an installed state in which an obstacle sensor, according to the first embodiment, has been installed on a rear part of a vehicle.
Figure 4:
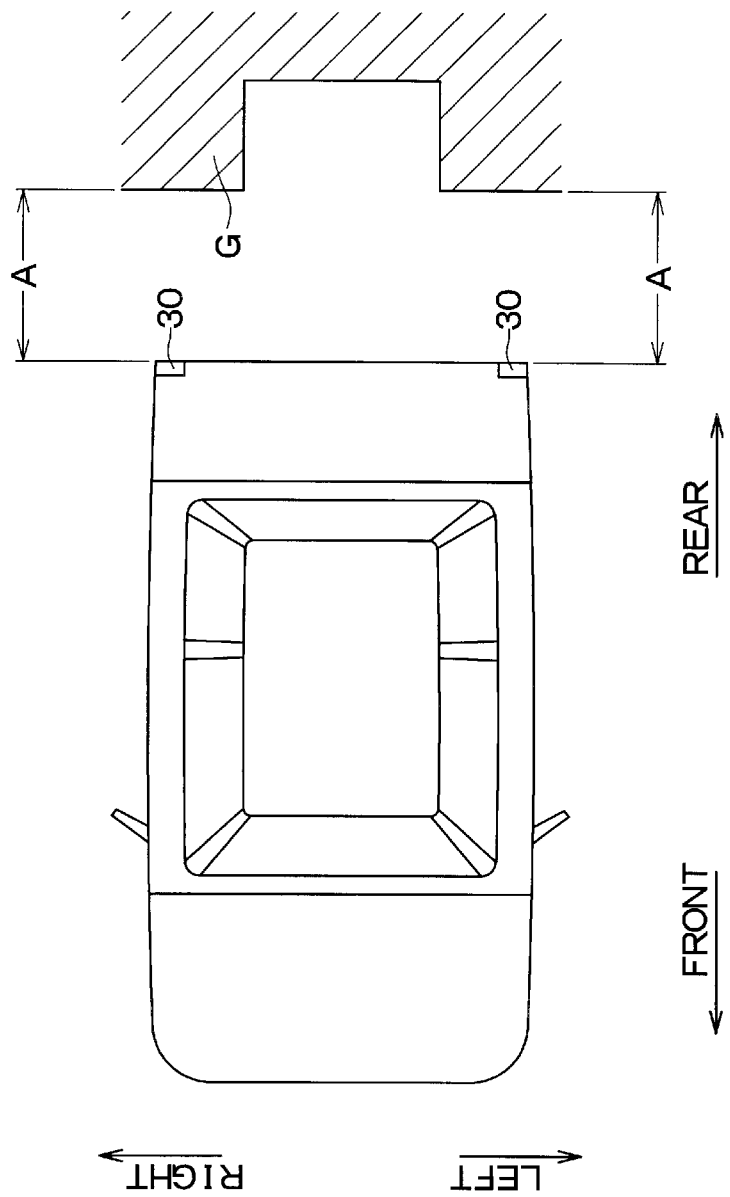
FIG. 4 is a plan view showing an installed state in which the obstacle sensor, according to the first embodiment, has been installed on the rear part of the vehicle.
Figure 5:
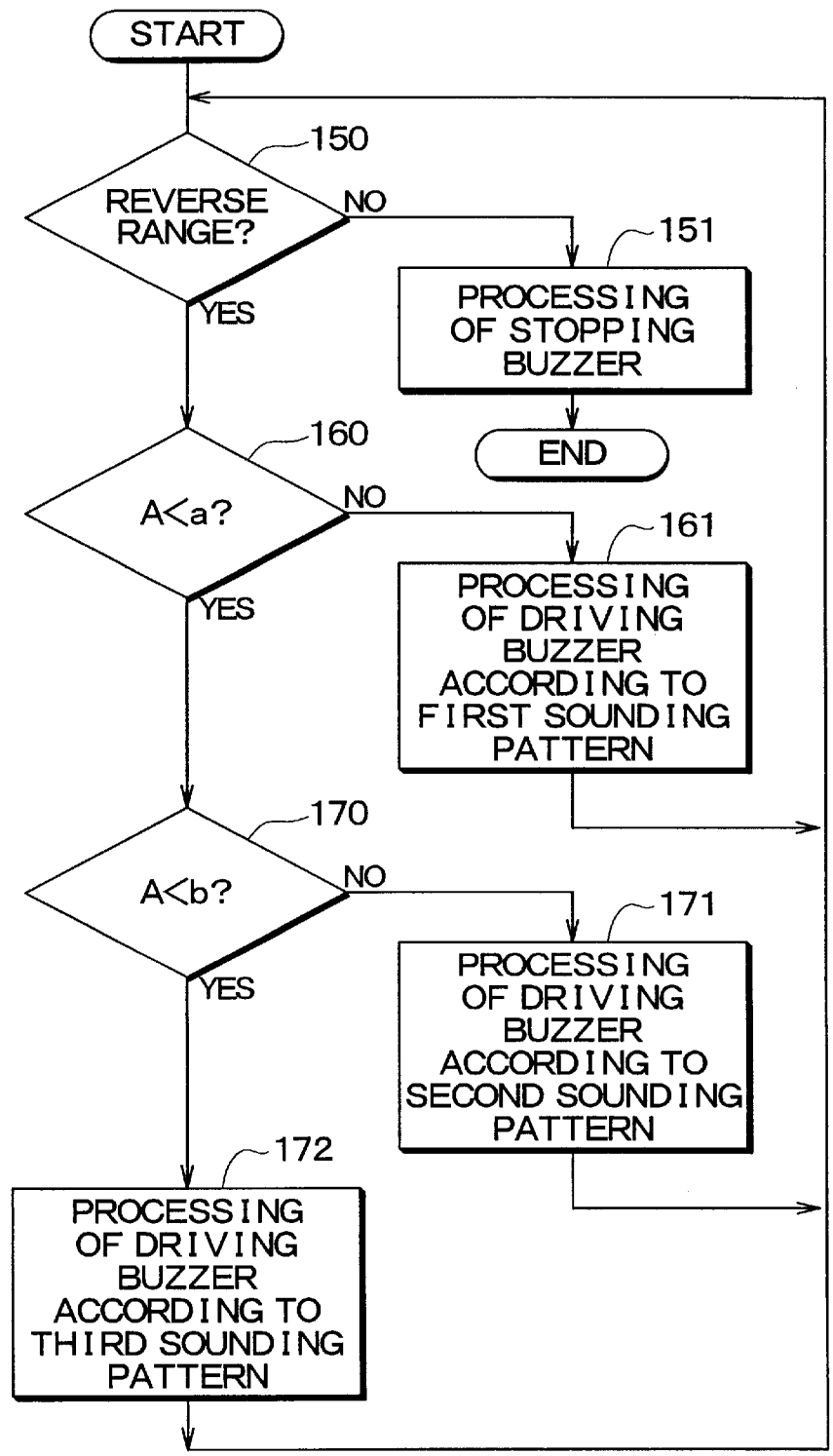
FIG. 5 is a flowchart showing the operation of the microcomputer 21 shown in FIG. 1.

The microcomputer 21 executes a computer program in accordance with a flowchart shown in FIG. 5 to perform processing for the above-described control. The obstacle sensor 30 is provided at left and right ends (see FIGS. 3 and 4) of a rear bumper of the vehicle. Under the control of the obstacle alarm device control circuit 20, each obstacle sensor 30 sends an ultrasonic wave to obstacles. Upon detection of an ultrasonic wave reflected from the obstacles, the obstacle sensors 30 output signals to the obstacle alarm device control circuit 20.

In the first embodiment constructed as described above, when the ignition switch IG is turned on the meter control circuit 10 and the obstacle alarm device control circuit 20 go into an operation state. The vehicle is then placed in a travel state.

Consequently, according to an output of the vehicle-speed sensor 130, the meter control circuit 10 makes a display control of the speed meter 60, the tachometer 70, and the odo-trip meter 90. According to ON of any one of the speed-change switches 141 through 146, the meter control circuit 10 also makes a display control of the indicator 80.

In the obstacle alarm device control circuit 20, in accordance with the flowchart shown in FIG. 5, the microcomputer 21 starts to execute the computer program. Initially, it is determined at step 150 of FIG. 5 whether the speed-change range of the automatic speed-change gear is placed in the reverse range. If the speed-change switch 142 of the speed change switching mechanism 140 is OFF, the determination at step 150 is NO. As a result, at step 151, the microcomputer 21 executes processing of stopping the buzzer 50.

If the speed-change switch 142 is ON to move the vehicle rearward, the determination at step 150 is YES. Then, at step 160, an actual distance A (see FIGS. 3 and 4) between the rear bumper of the vehicle and an obstacle G located rearward from the rear bumper is compared with a shortest distance a of distances for which alarm is not required about the presence of the obstacle.

If the distance A is longer than the shortest distance a, the determination at step 160 is NO. At step 161, the microcomputer 21 executes the processing for driving the buzzer 50, according to a first sounding pattern (see FIG. 6(*a*)).

Figure 6:
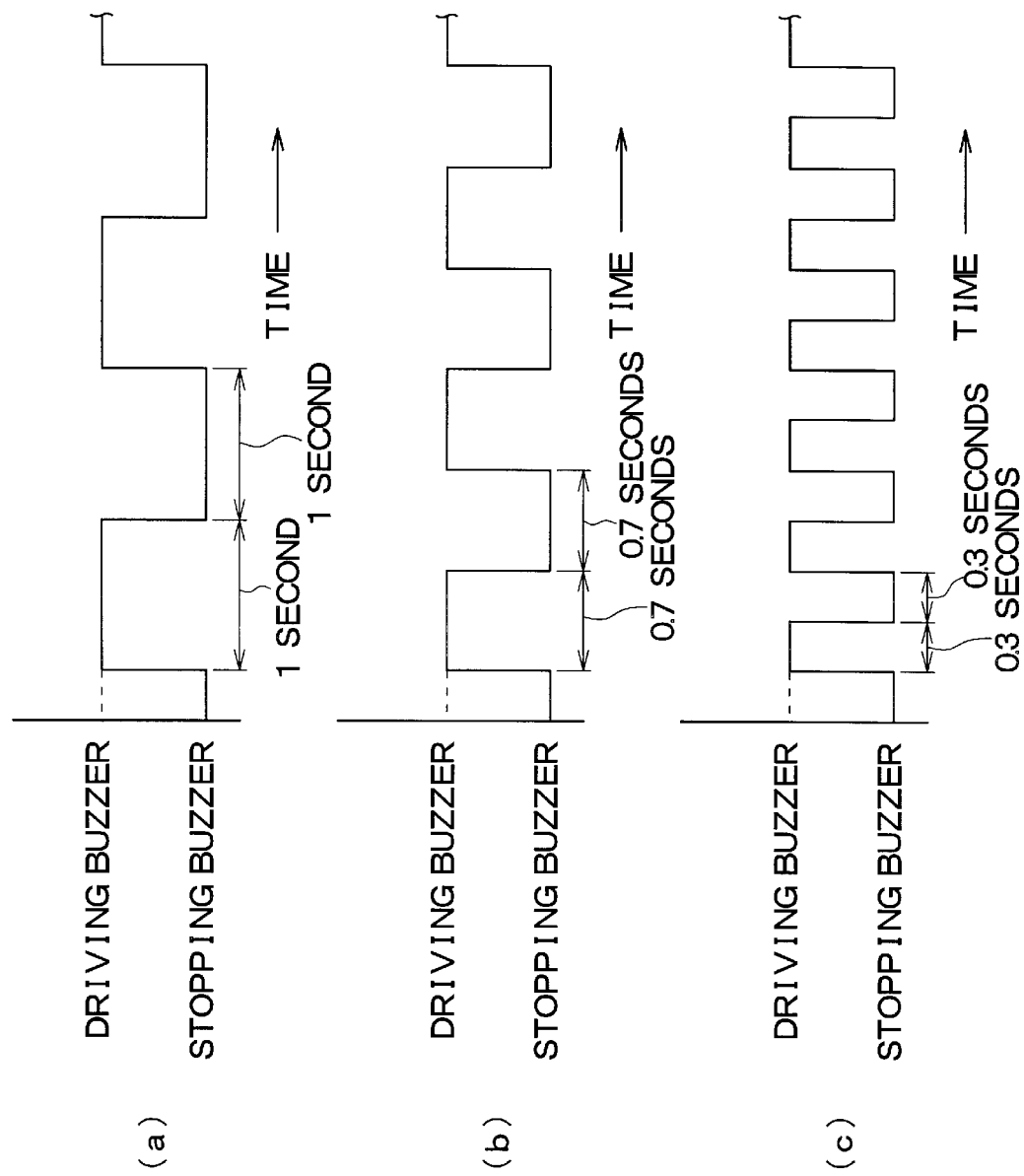
FIGS. 6(a) through 6(c) are timing charts showing sounding patterns of a buzzer, used in the first embodiment, different from each other according to an approach extent of a rear bumper of the vehicle to an obstacle.
Figure 7:
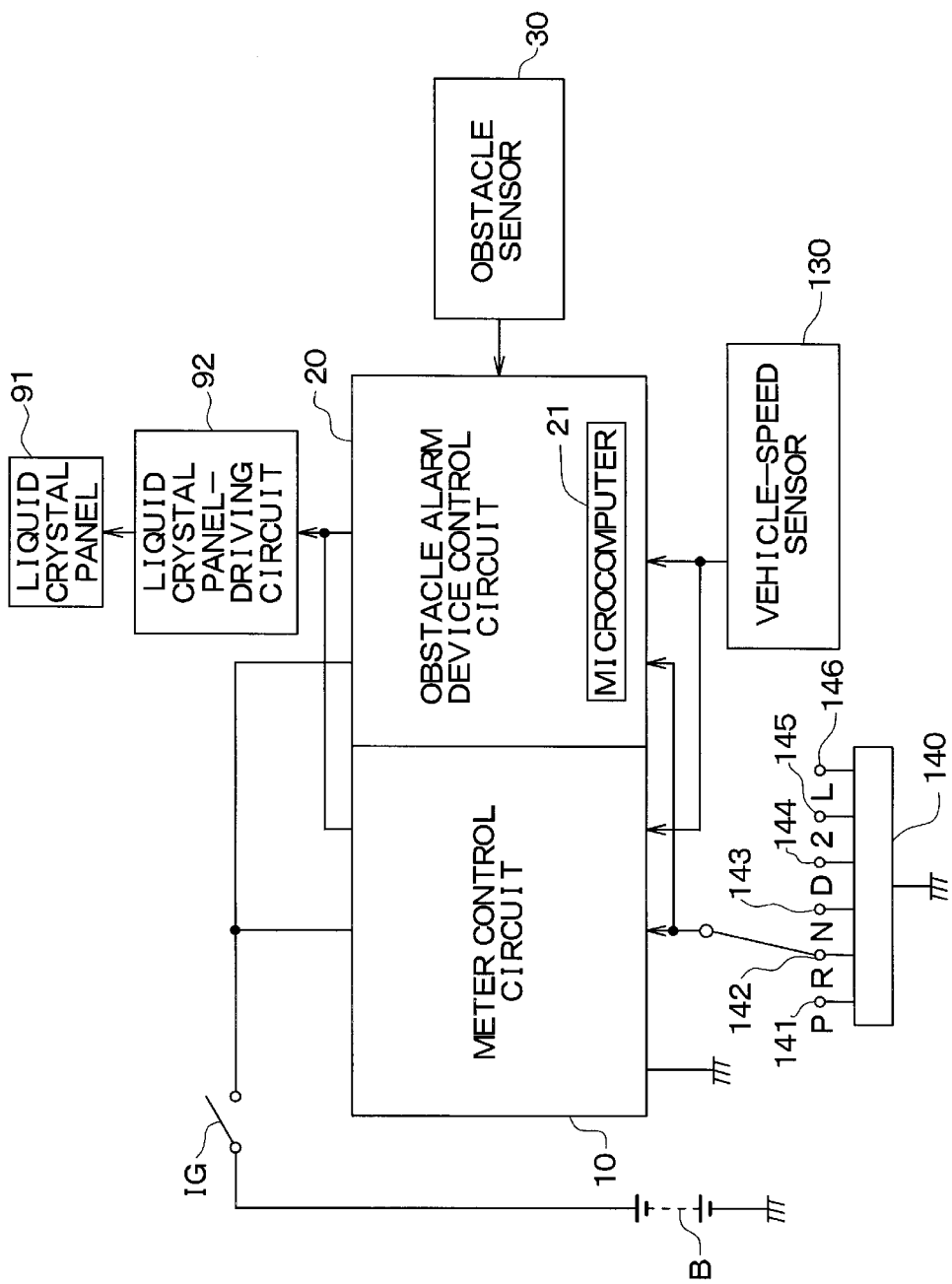
FIG. 7 is a block diagram showing a second embodiment of the present invention.

As shown in FIG. 6(*a*), the first sounding pattern is set so that the buzzer 50 sounds for one second at intervals of one second. The first sounding pattern applies to the case in which it is unnecessary to consider whether there is an obstacle in the rear of the vehicle in its rearward movement.

Thereby under the control of the microcomputer 21, driven by the buzzer driving circuit 40, the buzzer 50 sounds for one second every one second. Thus, the vehicle can be moved rearward with a sense of security.

If the determination at step 160 is YES, at step 170, the actual distance A is compared with an approach distance b between the rear bumper of the vehicle and the obstacle G when the vehicle has approached the obstacle G by a certain extent.

If the distance A is more than the approach distance b, the determination made at step 170 is NO. Then at step 171, the microcomputer 21 executes processing of driving the buzzer 50 according to a second sounding pattern (see FIG. 6(*b*)).

As shown in FIG. 6(*b*), the second sounding pattern is set so that the buzzer 50 sounds for 0.7 seconds at intervals of 0.7 seconds.

Thereby under the control of the microcomputer 21, driven by the buzzer driving circuit 40, the buzzer 50 sounds for 0.7 seconds every 0.7 seconds. In this manner, an alarm that the vehicle is approaching the obstacle G by a certain extent in its rearward movement is given.

If the determination at step 170 is YES, at step 172, the microcomputer 21 executes the processing for driving the buzzer 50 according to a third sounding pattern (see FIG. 6(*c*)).

As shown in FIG. 6(*c*), because the vehicle is further approaching the obstacle G, the third sounding pattern is set so that the buzzer 50 sounds for 0.3 seconds at intervals of 0.3 seconds.

Thereby under the control of the microcomputer 21, driven by the buzzer driving circuit 40, the buzzer 50 sounds for 0.3 seconds every 0.3 seconds. In this manner, an alarm that the vehicle is further approaching the obstacle G in its rearward movement is given.

As described above, in the first embodiment, the buzzer driving circuit 40 and the buzzer 50 are used as the constituting elements shared by the meter and the obstacle alarm device. In this construction, a normal alarm is given in the rearward movement of the vehicle by switching the speed-change range of the automatic speed-change gear to the reverse range, and an alarm is also given for the approach of the vehicle to the obstacle G in the rearward movement of the vehicle. Accordingly, it is unnecessary to provide both the meter and the obstacle alarm device with the buzzer-driving circuit and buzzer. This construction allows a reduction in the number of constituting elements, thus contributing to a reduction in cost and a saving of space.

In the first embodiment, the case in which the buzzer 50 sounds intermittently according to any one of the first through third sounding patterns has been described. Also, the sound volume of the buzzer 50 may be increased sequentially or stepwise according to an approach extent of the vehicle to the obstacle G or the sound frequency of the buzzer 50 may be increased sequentially or stepwise according to an approach extent of the vehicle to the obstacle G.

The first embodiment in which the buzzer 50 sounds according to any one of the first through third operating patterns has been described. But the present invention may be embodied by appropriately changing the sounding interval and time period of each of the first through third operating patterns.

In the first embodiment, the case in which the microcomputer 21 executes the processing for sounding the buzzer 50 according to the first through third operating patterns has been described. But the microcomputer of the meter control circuit 10 may execute the processing for sounding the buzzer 50 according to the first sounding pattern, whereas the microcomputer 21 of the obstacle alarm device control circuit 20 may execute the processing for sounding the buzzer 50 according to the second and third sounding patterns.

SECOND EMBODIMENT

A second embodiment of the present invention will be described below with reference to FIGS. 7 through 10. In the second embodiment the liquid crystal panel 91 constituting the odo-trip meter 90 described in the first embodiment and a liquid crystal panel-driving circuit (hereinafter referred to as liquid crystal panel-driving circuit 92) are used as the constituting element shared by the meter and the obstacle alarm device in place of the buzzer driving circuit 40 and the buzzer 50. In the second embodiment, the buzzer driving circuit 40 and the buzzer 50 are used for the meter.

Figure 8:
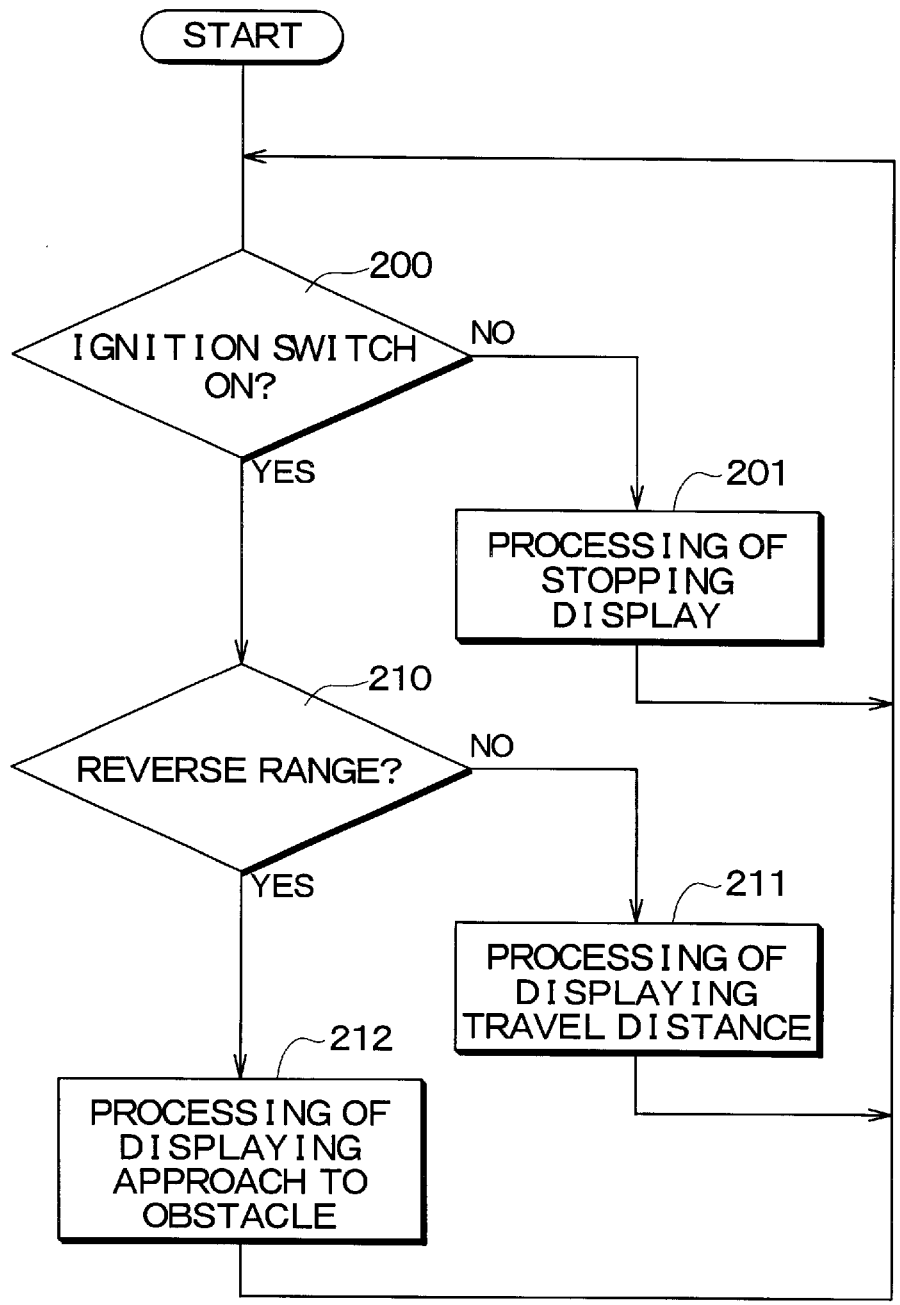
FIG. 8 is a flowchart showing the operation of the microcomputer 21 shown in FIG. 7.
Figure 9:
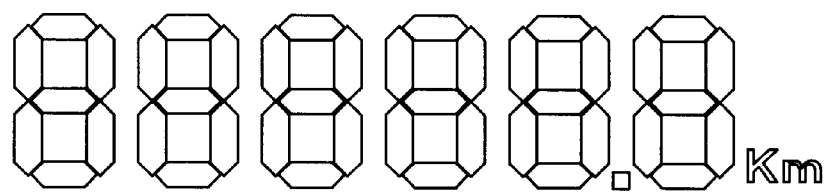
FIGS. 9(a) through 9(c) show an example of an odo-trip display, a trip display, and an odo-display of an odo-trip meter 90.
Figure 9:
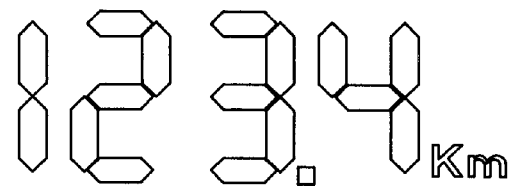
Figure 9:
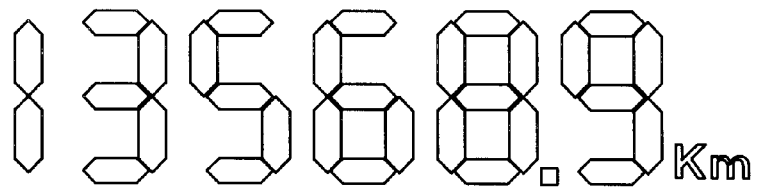
Figure 10:
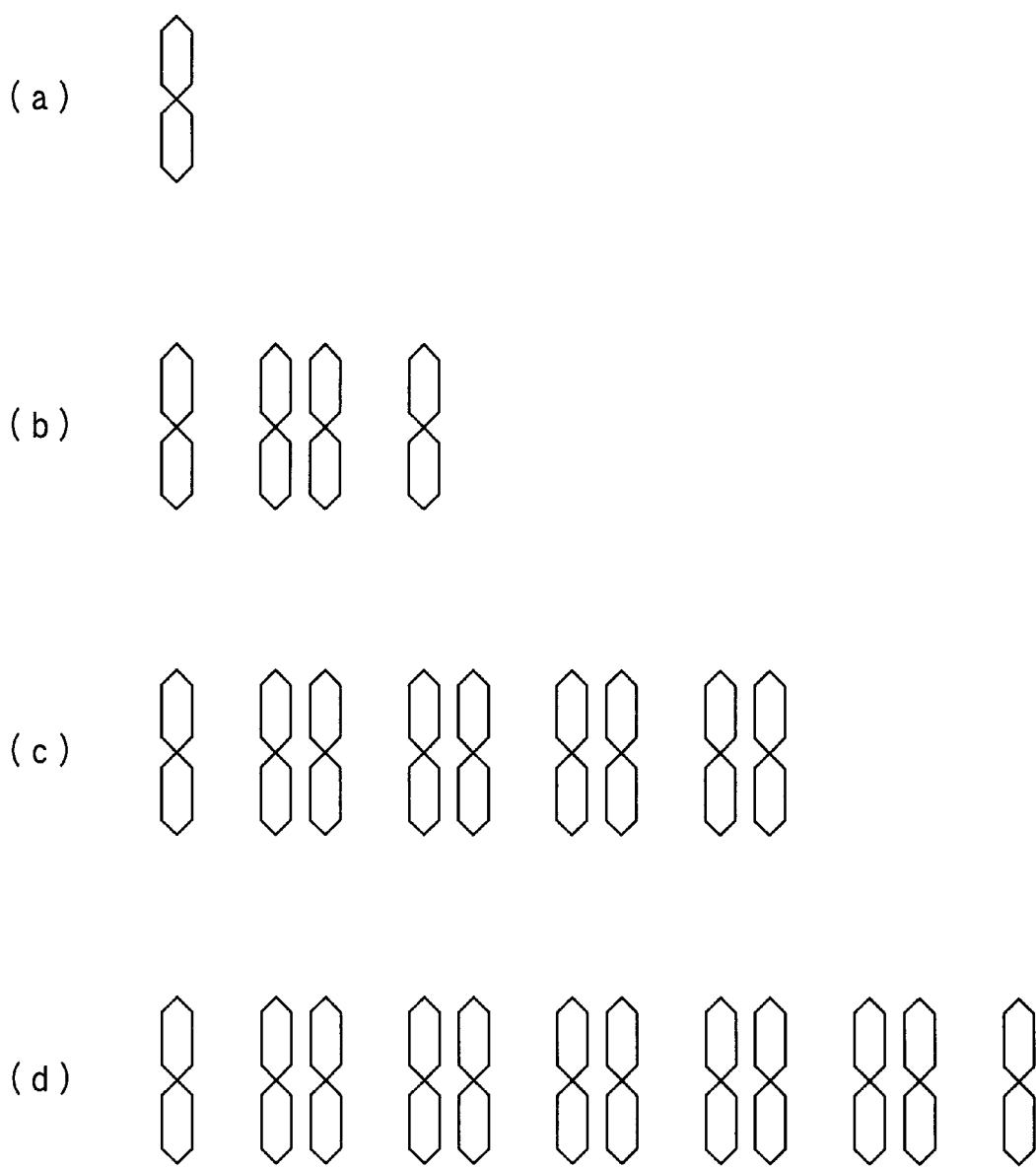
FIGS. 10(a) through 10(d) show the change of a display pattern of a liquid crystal panel 91 of the odo-trip meter 90 which change according to approach of a rear bumper of a vehicle to an obstacle in a second embodiment.

In the second embodiment, the microcomputer 21 described in the first embodiment executes a computer program in accordance with a flowchart shown in FIG. 8 instead of the flowchart shown in FIG. 5. Unlike the first embodiment, the meter control circuit 10 and the obstacle alarm device control circuit 20 are supplied with electric power directly from a battery B in addition to the electric power from the ignition switch IG. The other constructions of the second embodiment are similar to those of the first embodiment.

In the second embodiment constructed as described above, when both the meter control circuit 10 and the obstacle alarm device control circuit 20 are supplied with electric power directly from the battery B, both are placed in an operating state. In this state, in accordance with the flowchart shown in FIG. 8, if the determination at step 200 is NO, the microcomputer 21 executes the processing for stopping the display of the liquid crystal panel 91 at step 201.

When the ignition switch IG is turned on in this state, the microcomputer 21 makes a determination of YES at step 200. Thereafter, it is determined at step 210 whether the speed-change range of the automatic speed-change gear described in the first embodiment is in the reverse range.

If the speed-change switch 142 of the speed change switching mechanism 140 is off the determination at step 210 is NO. Thereafter, at step 211 the microcomputer 21 executes the processing for displaying a travel distance by means of the liquid crystal panel 91.

Thus, under the control of the microcomputer 21 over the liquid crystal panel driving circuit 92 in the odo-trip meter 90, an odo-trip display, a trip display or an odo-display is made on the liquid crystal panel 91.

For example, the odo-trip display corresponds to the display of a total travel distance shown in FIG. 9(a) and the display of a section travel distance shown in FIG. 9(b). The trip display corresponds to the display of the section travel distance shown in FIG. 9(b). The odo-display corresponds to the display of a total travel distance shown in FIG. 9(c).

If the determination at step 210 is YES because of ON of the speed-change switch 142, a display that the vehicle has approached the obstacle is executed at step 212, considering that the vehicle is moving rearward.

Thereby under the control of the microcomputer 21 over the liquid crystal panel driving circuit 92, in the odo-trip meter 90, an approach of the rear bumper of the vehicle to the obstacle G is displayed on the liquid crystal panel 91.

More specifically, as the rear bumper of the vehicle approaches the obstacle G, the number of display segments of "1" is increased sequentially on the liquid crystal panel 91, as shown in FIGS. 10(a) through 10(d).

Thereby the liquid crystal panel 91 gives an alarm that the vehicle is further approaching the obstacle G in its rearward movement. When the vehicle moves rearward because of ON of the speed-change switch 142, the meter control circuit 10 sounds the buzzer 50 through the buzzer driving circuit 40 described in the first embodiment.

As described above, in the second embodiment, the liquid crystal panel-driving circuit 92 and the liquid crystal panel 91 are used as the constituting element shared by the meter and the obstacle alarm device. In this construction, the odo-trip meter 90 makes the display of the travel distance and the alarm display for the approach of the vehicle to the obstacle G in the rearward movement of the vehicle.

Accordingly, it is unnecessary to provide the obstacle alarm device with the buzzer-driving circuit and the buzzer. This construction allows reduction of the number of constituting elements, thus contributing to cost reduction and space-saving. The other operations and effects of the meter and the obstacle alarm device of the second embodiment are similar to those of the first embodiment.

In the second embodiment, description has been made on the case in which the extent of the approach of the rear bumper of the vehicle to the obstacle G present rearward from the rear bumper is sequentially displayed on the liquid crystal panel 91, as shown in FIGS. 10(a) through 10(d). Also, it is possible to display the extent of the approach of the left and right ends of the rear bumper of the vehicle to the obstacle G present rearward from the rear bumper on the liquid crystal panel 91 sequentially.

Figure 11:
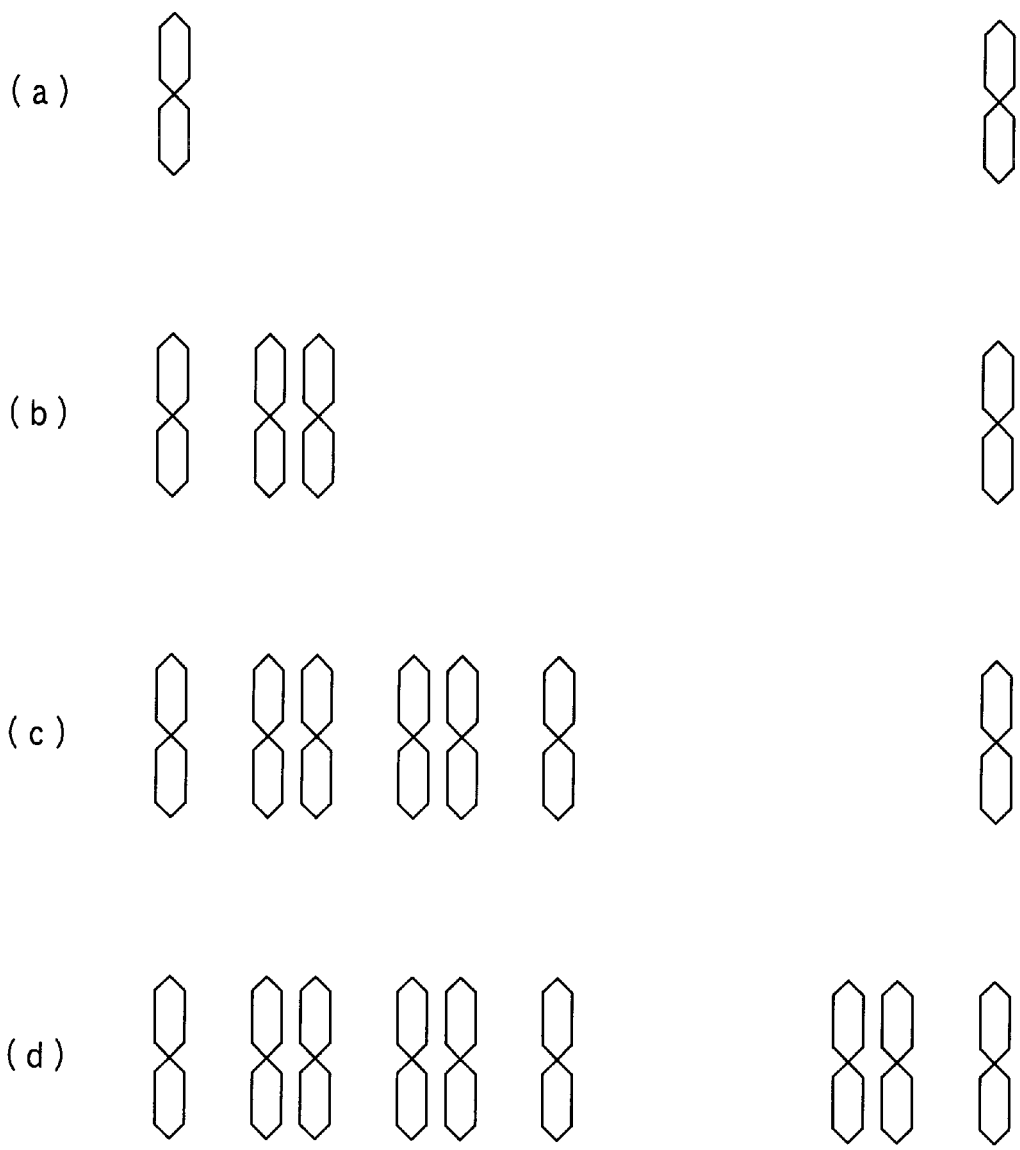
FIGS. 11(a) through 11(d) show an example of the display of the liquid crystal panel 91 according to a modification of a third embodiment.

For example, when there is a sufficiently long distance between the obstacle G present rearward from the rear bumper and the left end of the rear bumper as well as the right end thereof, as shown in FIG. 11(a), a segment of "1" is displayed on the liquid crystal panel 91 at its left and right ends.

When the left end of the rear bumper has become closer to the obstacle G than the right end thereof, the display may be made on the liquid crystal panel 91 in such a way that the number of the display segments of "1" at the left side of the liquid crystal panel 91 is made to be larger than the number thereof at the right side thereof, as shown in FIG. 11(b).

When the left end of the rear bumper has become much closer to the obstacle G than the right end thereof, the display may be made on the liquid crystal panel 91 in such a way that the number of the display segments of "1" at the left side of the liquid crystal panel 91 is made to be much larger than the number thereof at the right side thereof, as shown in FIG. 11(c).

When the left end of the rear bumper has become much closer to the obstacle G than the right end thereof and the right end thereof has become closer to the obstacle G, the display may be made on the liquid crystal panel 91 in such a way that the number of the display segments of "1" at the right side of the liquid crystal panel 91 is increased, as shown in FIG. 11(d)

In the second embodiment, the extent of the approach of the vehicle to the obstacle G is displayed on the liquid crystal panel 91. When the distance between the rear bumper of the vehicle and the obstacle G is less than a predetermined distance, the color of the display on the liquid crystal panel 91 may be changed or the buzzer 50 may be sounded.

In the second embodiment, as the rear bumper of the vehicle approaches the obstacle G, the display mode of the liquid crystal panel 91 is changed, as shown in FIGS. 10(a) through 10(d). But instead of the display mode, the segment of "1" may be displayed on the liquid crystal panel 1 in such a way that the display segment "1" moves in a flow-like manner as the rear bumper approaches the obstacle G or a display segment of "8" may be displayed on the liquid crystal panel 1 in such a way that "8" is rotated with it moving in a flow-like manner as the rear bumper approaches the obstacle G.

Further, the liquid crystal panel 91 may be replaced with a fluorescent character display tube or an electroluminescence panel.

THIRD EMBODIMENT

FIGS. 12 through 15 show a third embodiment of the composite apparatus of the present invention.

Figure 12:
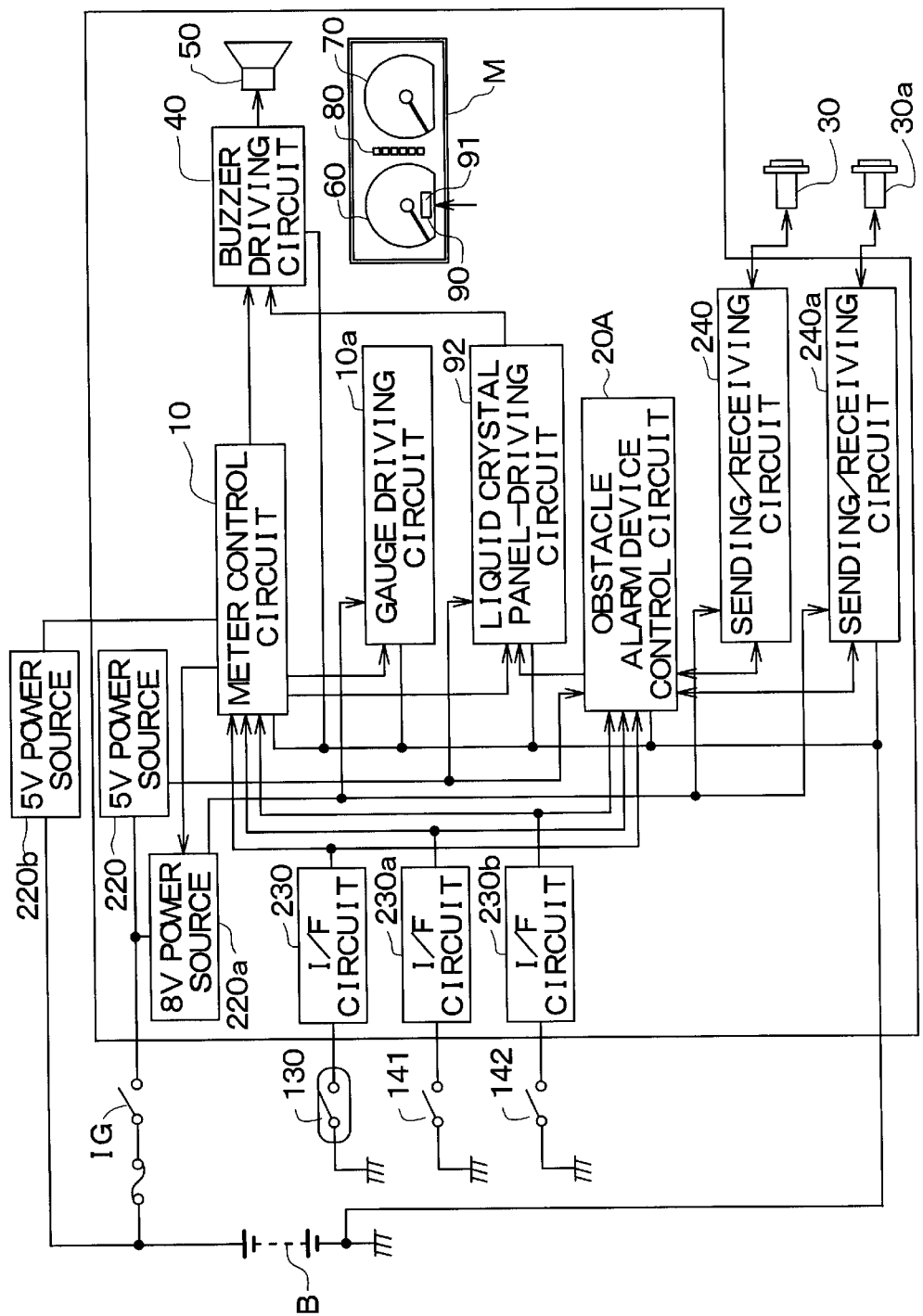
FIG. 12 is a block diagram showing the third embodiment of the present invention.

As shown in FIG. 12, the composite apparatus includes a 5V power source 220 and an 8V power source 220a. The 5V power source 220 and the 8V power source 220a are connected to the battery B through the ignition switch IG described in the first embodiment. Thereby the 5V power source 220 and the 8V power source 220a generate a constant voltage of 5V and 8V respectively from the electric power supply of the battery B caused by ON of the ignition switch IG.

The composite apparatus includes interface circuits 230, 230a, and 230b (hereinafter referred to as I/F circuit 230, 230a, and 230b).

The I/F circuit 230 is connected to the vehicle-speed sensor 130 described in the first embodiment. The I/F circuit 230 executes waveform shaping of output pulses of the vehicle-speed sensor 130 sequentially to generate waveform shaping pulses.

The I/F circuits 230a and 230b are connected to the speed-change switches 141 and 142 of the automatic speed-change gear described in the first embodiment respectively.

Thereby, based on turn-on of the speed-change switch 141, the I/F circuit 230a generates a parking range signal.

Based on turn-on of the speed-change switch 142, the I/F circuit 230b generates a reverse range signal.

The composite apparatus has the meter control circuit 10 described in the first embodiment and an obstacle alarm device control circuit 20A, described in the first embodiment in the obstacle alarm device control circuit 20 described in the first embodiment.

In addition to the function described in the first embodiment, the meter control circuit 10 sounds the buzzer 50 through the buzzer driving circuit 40 in the rearward movement of the vehicle as a result of switching (ON of the speed-change switch 142) the speed-change range of the automatic speed-change gear to the reverse range.

In performing the function described in the first embodiment, the meter control circuit 10 executes a display control of the speed meter 60 and the tachometer 70 through a gauge driving circuit 10a corresponding to the driving portion of the speed meter 60 and the tachometer 70 described in the first embodiment. The meter control circuit 10 also executes a display control of the indicator 80 described in the first embodiment and the liquid crystal panel 91 through the liquid crystal panel driving circuit 92. The constant voltage of the 5V power source 220 and the 8V power source 220a are applied to the gauge-driving circuit 10a and the liquid crystal panel driving circuit 92 respectively. Upon receipt of the constant voltage of 5V of the 5V power source 220a supplied from the battery B, the meter control circuit 10 is actuated. Under the applied constant voltage of 5V, the meter control circuit 10 places the 8V power source 220a in an operating state or an operation stop state.

The obstacle alarm device control circuit 20A is a microcomputer and actuated upon receipt of the constant voltage from the 5V power source 220. The obstacle alarm device control circuit 20A sounds the buzzer 50 through the buzzer driving circuit 40, upon receipt of an output signal of each of the I/F circuits 230 and 230b and an output of each sending/receiving circuits 240 and 240a which will be described later.

According to an output signal of each of the I/F circuits 230, 230a, and 230b, the obstacle alarm device control circuit 20 drives the buzzer 50 as a result of the buzzer driving circuit 40.

Figure 15:
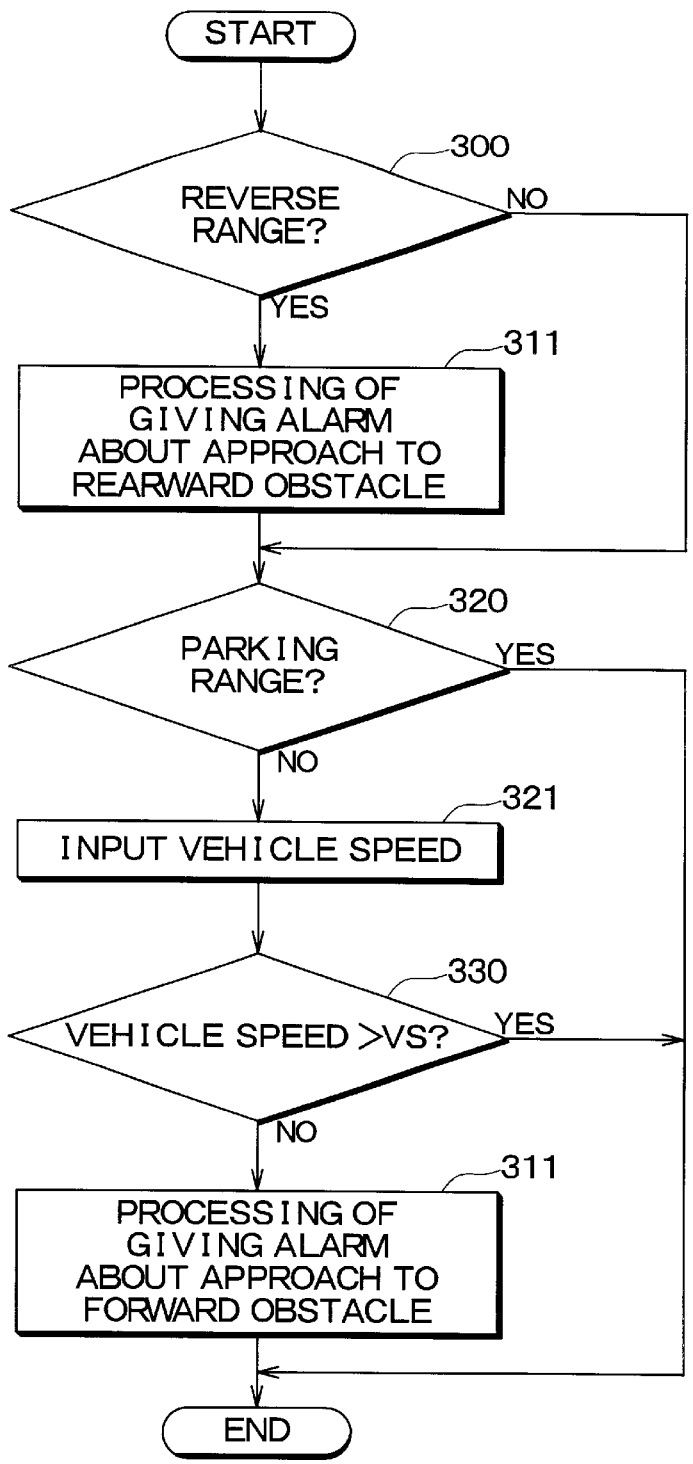
FIG. 15 is a flowchart showing the operation of a microcomputer which is an obstacle alarm device control circuit 20A of FIG. 14.

In the third embodiment, the microcomputer which is the obstacle alarm device control circuit 20A executes a computer program in accordance with a flowchart shown in FIG. 15 rather than the flowchart shown in FIG. 5.

Under the control of the obstacle alarm device control circuit 20A, the sending/receiving circuit 240 outputs an ultrasonic signal to both obstacle sensors 30 described in the first embodiment.

The sending/receiving circuit 240 generates an output upon receipt of an ultrasonic signal outputted from each of the obstacle sensors 30.

Figure 13:
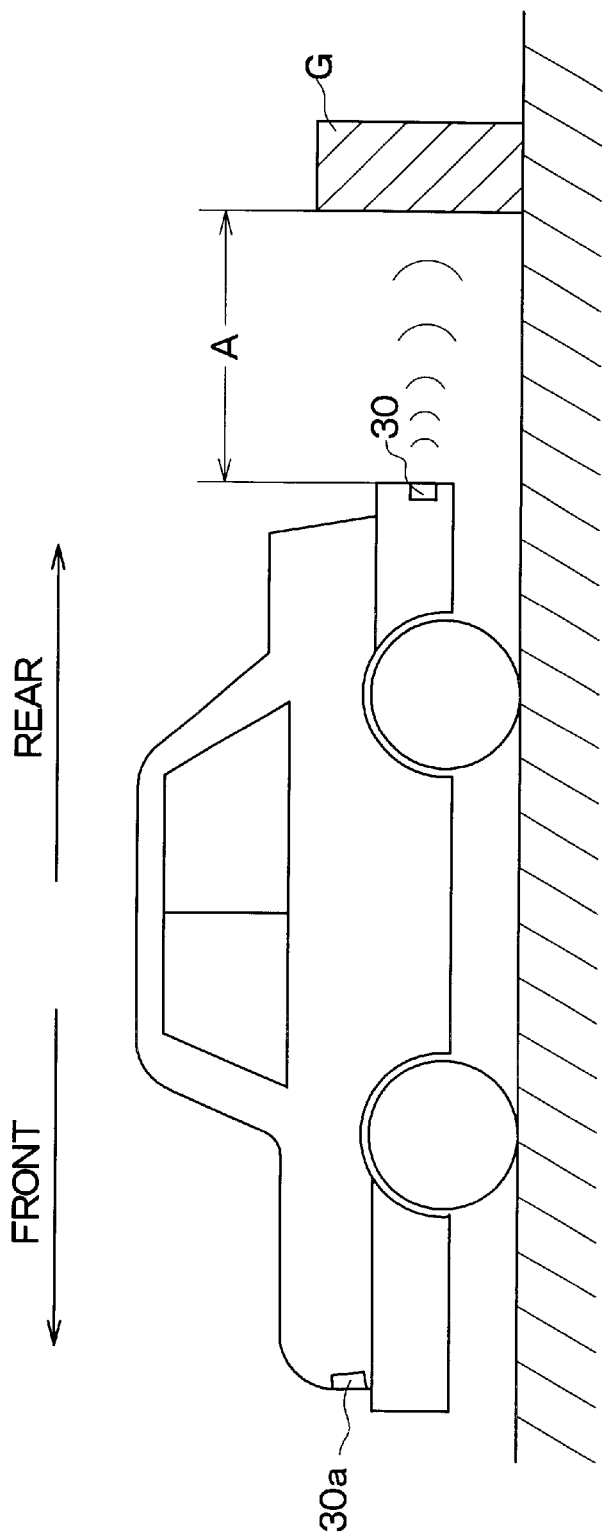
FIG. 13 is a side view showing a state in which obstacle sensors, of the third embodiment, are mounted on a vehicle at its front and rear parts.
Figure 14:
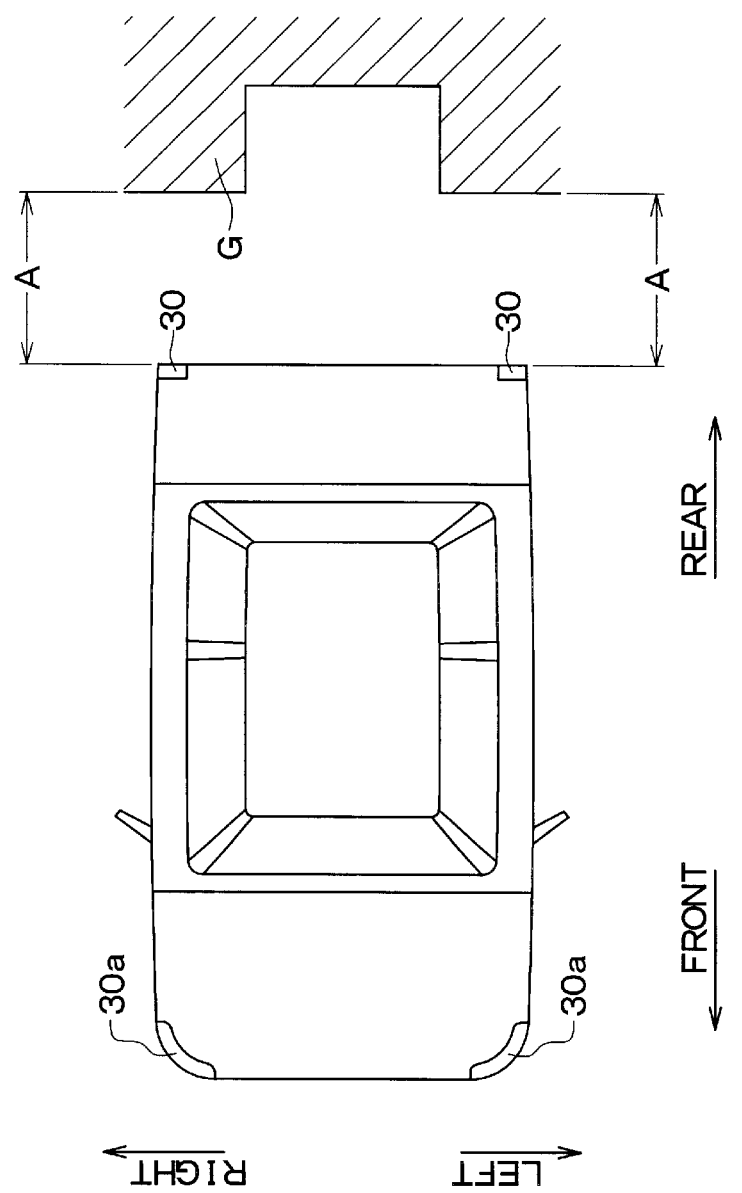
FIG. 14 is a plan view showing a state in which the obstacle sensors are mounted on the vehicle at its front and rear parts in the third embodiment.

Under the control of the obstacle alarm device control circuit 20A, the sending/receiving circuit 240a outputs an ultrasonic signal to each of the obstacle sensors 30a (see FIGS. 13 and 14). The sending/receiving circuit 240a generates an output upon receipt of an ultrasonic signal outputted from each of the obstacle sensors 30a.

One of both obstacle sensors 30a is installed at the left end of the front bumper of the vehicle, whereas the other obstacle sensor 30a is installed at the right end thereof. Both obstacle sensors 30a output an ultrasonic wave to an obstacle present forward from the front bumper of the vehicle. Upon receipt of an ultrasonic wave reflected from the obstacle, the obstacle sensors 30a output the ultrasonic signals to the sending/receiving circuit 240a. The constant voltage is applied to both sending/receiving circuits 240 and 240a from the 8V power source 220a.

In the third embodiment, the 5V power source 220, the 8V power source 220a, the I/F circuits 230, 230a, and 230b, the buzzer-driving circuit 40, and the buzzer 50 are the constituting elements shared by the meter and the obstacle alarm device. The obstacle alarm device control circuit 20A, the sending/receiving circuit 240, and the sending/receiving circuit 240a are the circuit components of the obstacle alarm device, whereas the meter control circuit 10, the gauge-driving circuit 10a, and the meter body M are the circuit components of the meter.

In the third embodiment constructed as described above, when the ignition switch IG is turned on the meter control circuit 10 and the obstacle alarm device control circuit 20A are actuated upon receipt of the constant voltage from the 5V power source 220. The gauge-driving circuit 10a and both sending/receiving circuits 240 and 240a are actuated upon receipt of the constant voltage from the 8V power source 220a. The vehicle is then placed in a travel state.

Thereafter, according to an output of the vehicle-speed sensor 130, the meter control circuit 10 controls the gauge-driving circuit 10a, the liquid crystal panel driving circuit 92, and the buzzer driving circuit 40. Thereby the speed meter 60 and the tachometer 70 are driven by the gauge-driving circuit 10a and display the speed of the vehicle and the number of rotations.

With the liquid crystal panel 91 driven by the liquid crystal panel-driving circuit 92, the odo-trip meter 90 displays an addition of travel distances. With a speed-change operation of the automatic speed-change gear, the meter control circuit 10 displays the speed-change range by means of the indicator 80. With the switching of the speed-change range of the automatic speed-change gear to the reverse range, the meter control circuit 10 sounds the buzzer 50 through the buzzer-driving circuit 40.

Upon application of the constant voltage to the obstacle alarm device control circuit 20A from the 5V power source 220, the obstacle alarm device control circuit 20A starts to execute the computer program in accordance with the flowchart of FIG. 15.

Thereafter, it is determined at step 300 whether the speed-change range of the automatic speed-change gear is in the reverse range.

If the speed-change switch 142 of the speed change switching mechanism 140 is OFF, the computer program goes to step 320.

In comparison, if the speed-change switch 142 is ON to move the vehicle rearward, the determination at step 300 is YES. Then, at step 311 the obstacle alarm device control circuit 20A executes the processing for giving an alarm for the approach of the vehicle to the obstacle present rearward from the vehicle as follows:

That is, when the obstacle alarm device control circuit 20A outputs an ultrasonic wave-sending instruction to the sending/receiving circuit 240, the sending/receiving circuit 240 outputs an ultrasonic wave-sending signal to each obstacle sensor 30. At least one of both obstacle sensors 30 receives the ultrasonic wave reflected from the obstacle G and outputs the ultrasonic signal to the sending/receiving circuit 240 when each obstacle sensor 30 sends the ultrasonic wave to the obstacle G present rearward from the vehicle.

Based on the received signal the sending/receiving circuit 240 applies an output to the obstacle alarm device control circuit 20A. Thereafter, the obstacle alarm device control circuit 20A sounds the buzzer 50 through the buzzer driving circuit 40. Thereby, an alarm that the rear bumper of the vehicle is approaching the obstacle G present rearward from the rear bumper is given. At the end of the processing executed at step 311 the speed-change switch 142 is turned off. This means the termination of the rearward movement of the vehicle.

Upon termination of the processing at step 311 as described above, it is determined at subsequent step 320 whether the speed-change range of the automatic speed-change gear is in the parking range. If the I/F circuit 230a does not generate a parking range signal, the determination at step 320 is NO.

That is, based on the determination that the vehicle is in a travel state at step 321 according to a waveform shaping signal outputted from the I/F circuit 230, the obstacle alarm device control circuit 20A computes the speed of the vehicle.

If the computed vehicle speed is less than a predetermined low speed Vs, the determination at step 330 is NO. Thus, at step 331 the obstacle alarm device control circuit 20A executes the processing for giving an alarm for the approach of the vehicle to the obstacle present forward from the vehicle as follows:

That is, when the obstacle alarm device control circuit 20A outputs an ultrasonic wave-sending instruction to the sending/receiving circuit 240a, the sending/receiving circuit 240a outputs an ultrasonic wave-sending signal to each obstacle sensor 30a. When each obstacle sensor 30a outputs the ultrasonic wave to the obstacle G present forward from the vehicle, at least one of both obstacle sensors 30a receives the ultrasonic wave reflected from the obstacle G and outputs the ultrasonic signal to the sending/receiving circuit 240a.

Based on the received signal, the sending/receiving circuit 240a applies an output to the obstacle alarm device control circuit 20A. Thereafter, the obstacle alarm device control circuit 20A sounds the buzzer 50 through the buzzer driving circuit 40. Thereby, an alarm that the front bumper of the vehicle is approaching the obstacle G present forward from the vehicle is given.

As described above, the 5V power source 220, the 8V power source 220a, the I/F circuits 230, 230a, and 230b, the buzzer-driving circuit 40, and the buzzer 50 are the constituting elements shared by both the meter and the obstacle alarm device. In this construction, a normal alarm is given in the rearward movement of the vehicle and an alarm is also given about the approach of the vehicle to the obstacle G present rearward therefrom in the rearward movement thereof or the approach of the vehicle to the obstacle G present forward therefrom in the forward movement thereof.

Accordingly, it is unnecessary to provide both the meter and the obstacle alarm device with the power source, the I/F circuit, the buzzer-driving circuit, and the buzzer. This construction allows reduction of the number of its constituting elements, thus contributing to cost reduction and space-saving. Further, it is possible to securely obtain the wiring space for a wire harness to be used for the meter and the obstacle alarm device. In addition, by locating circuits other than the circuit of the obstacle sensor of the obstacle alarm device at the side of the meter, it is unnecessary to provide the obstacle alarm device with a casing for specific use therefor.

In the third embodiment, an alarm is given by the buzzer 50 for the approach of the vehicle to the obstacle. Also, as described in the second embodiment, by displaying the alarm with the liquid crystal panel 91 of the odo-trip meter 90, the liquid crystal panel 91 and the liquid crystal panel-driving circuit 92 can be used as circuit elements shared by both the meter and the obstacle alarm device. Thus, the third embodiment is capable of achieving an operation and effect similar to that of the second embodiment.

FOURTH EMBODIMENT

Figure 16:
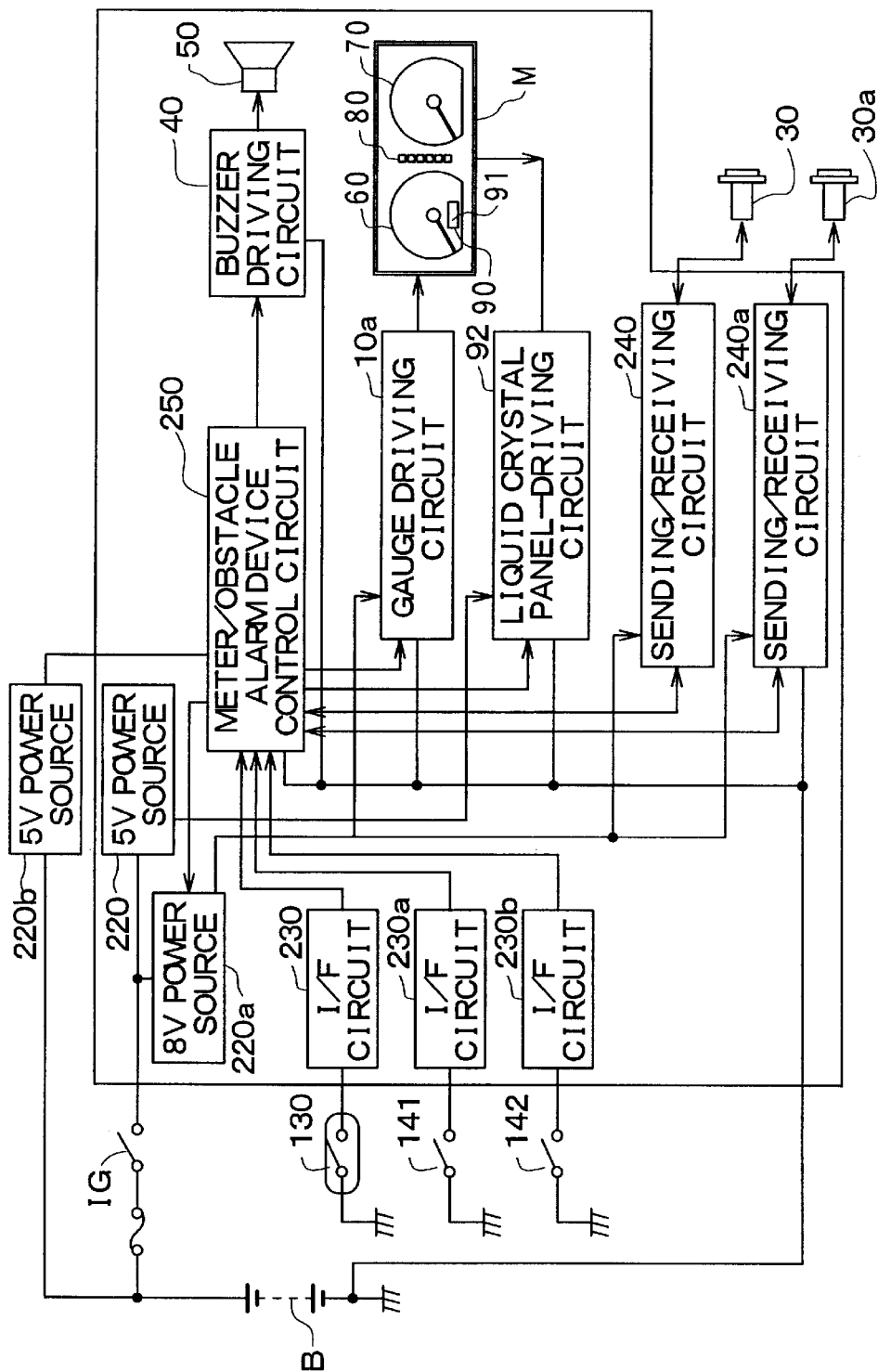
FIG. 16 is a block diagram showing a fourth embodiment of the present invention.
Figure 17:
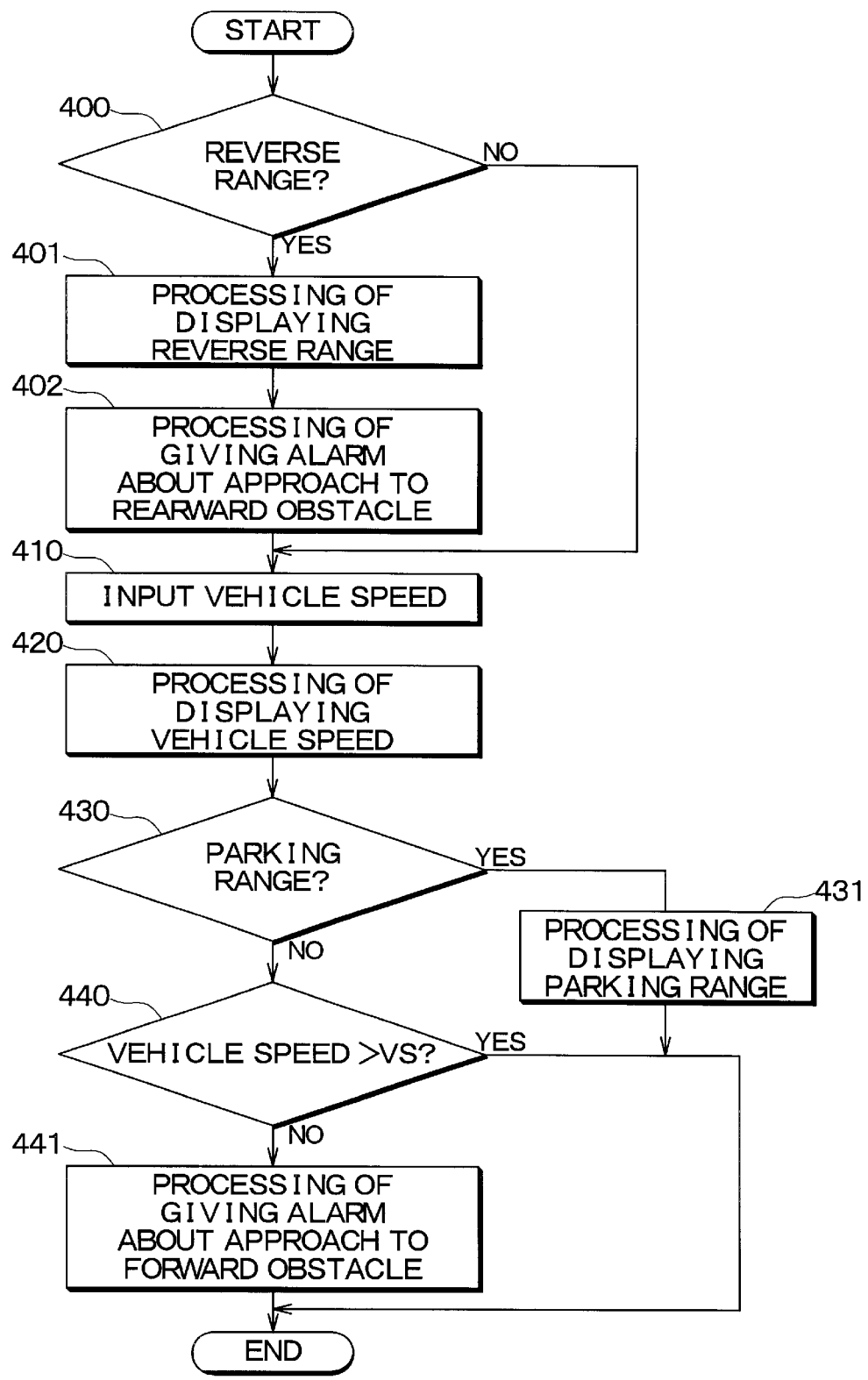
FIG. 17 is a flowchart showing the operation of a microcomputer which is a meter/obstacle alarm device control circuit 250 of FIG. 16.

FIGS. 16 and 17 show a fourth embodiment of the present invention.

In the fourth embodiment, a meter/obstacle alarm device control circuit 250 is adopted as a replacement for the meter control circuit 10 and the obstacle alarm device control circuit 20A described in the third embodiment.

The meter/obstacle alarm device control circuit 250 is a microcomputer that has the same function as both the meter control circuit 10 and the obstacle alarm device control circuit 20A.

The microcomputer which is the meter/obstacle alarm device control circuit 250 executes a computer program in accordance with a flowchart shown in FIG. 17.

In the fourth embodiment, in addition to the constituting element of the third embodiment, the meter/obstacle alarm device control circuit 250 is a constituting element shared by both the meter and the obstacle alarm device. The other constructions of the fourth embodiment are substantially similar to those of the third embodiment.

In the fourth embodiment constructed as described above, when the ignition switch IG is turned on, a constant voltage is applied to the meter/obstacle alarm device control circuit 250 from the 5V power source 220. Thus, the meter/obstacle alarm device control circuit 250 goes into an operating state. At this time, a constant voltage is also applied to the gauge-driving circuit 10a and the sending/receiving circuits 240 and 240a from the 8V power source 220a. Thus, both the gauge-driving circuit 10a and the sending/receiving circuits 240 and 240a go into an operating state. The vehicle is then placed in a travel state.

Consequently, in accordance with the flowchart of FIG. 17, the meter/obstacle alarm device control circuit 250 starts to execute the computer program. It is determined at step 400 whether the speed-change range of the automatic speed-change gear is placed in the reverse range.

If the speed-change switch 142 of the speed change switching mechanism 140 is OFF, the computer program goes to step 410.

In comparison, if the speed-change switch 142 is ON to move the vehicle rearward, the determination at step 400 is YES. Then, at step 401 reverse range processing is executed. More specifically, the indicator 80 makes a reverse range display.

Then, at step 402 the meter/obstacle alarm device control circuit 250 executes the processing for giving an alarm for the approach of the vehicle to the obstacle present rearward from the vehicle, similarly to the processing at step 311 shown in FIG. 15.

As a result of this processing, the meter/obstacle alarm device control circuit 250 sounds the buzzer 50 through the buzzer driving circuit 40. Thereby an alarm that the rear bumper of the vehicle is approaching the obstacle G present rearward from the vehicle is given. At the end of the processing at step 401, the speed-change switch 142 is turned off, which means the termination of the rearward movement of the vehicle.

Upon termination of the processing at step 401 as described above, at subsequent step 410 the meter/obstacle alarm device control circuit 250 computes the speed of the vehicle similarly to the processing executed at step 321 of FIG. 15. Then at step 420 the processing for displaying the vehicle speed is executed. Subsequently, the speed meter 60 displays the speed of the vehicle similarly to the third embodiment.

Thereafter, it is determined at subsequent step 430 whether the speed-change range of the automatic speed-change gear has been switched to the parking range similarly to the execution at step 320 of FIG. 15. If the I/F circuit 230*a* has generated a parking range signal the determination at step 430 is YES. Thus, at step 431 the processing for displaying the parking range is executed. Then, the indicator 80 makes a parking range display.

In comparison, if the determination at step 430 is NO, it is determined that the vehicle is placed in a travel state. Thus, at step 441 the speed of the vehicle computed at step 410 is compared with the predetermined low speed Vs.

If the computed vehicle speed is lower than the predetermined low speed Vs, the determination at step 440 is NO. Then, at step 441 the processing for giving an alarm about the approach of the vehicle to the obstacle G present forward from the vehicle is executed similarly to step 331 of FIG. 15.

Thereafter, the meter/obstacle alarm device control circuit 250 sounds the buzzer 50 through the buzzer driving circuit 40. Thereby, an alarm that the front bumper of the vehicle is approaching the obstacle G present forward from the vehicle is given.

The meter/obstacle alarm device control circuit 250 performs a function similar to that of the meter control circuit 10 described in the third embodiment. Accordingly, as described in the third embodiment, when the vehicle moves rearward the buzzer 50 sounds to give a normal alarm to be done in the rearward movement of the vehicle.

As described above in the fourth embodiment, in addition to the constituting element of the third embodiment, the meter/obstacle alarm device control circuit 250 corresponding to the meter control circuit 10 and the obstacle alarm device control circuit 20A are also the constituting element shared by both the meter and the obstacle alarm device. In the construction, as the display to be made by the meter, a normal alarm is given in the rearward movement of the vehicle and an the obstacle G present rearward therefrom in the rearward movement thereof or the approach of the vehicle to the obstacle G present forward therefrom in the forward movement thereof.

Accordingly, it is unnecessary to provide both the meter and the obstacle alarm device with the meter control circuit 10 and the obstacle alarm device control circuit 20A. Thus, it is possible to improve the operation and effect described in the third embodiment. In addition, by locating circuits other than the circuit of the obstacle sensor of the obstacle alarm device at the side of the meter, it is unnecessary to provide the obstacle alarm device with a casing for specific use therefor.

FIFTH EMBODIMENT

Figure 18:
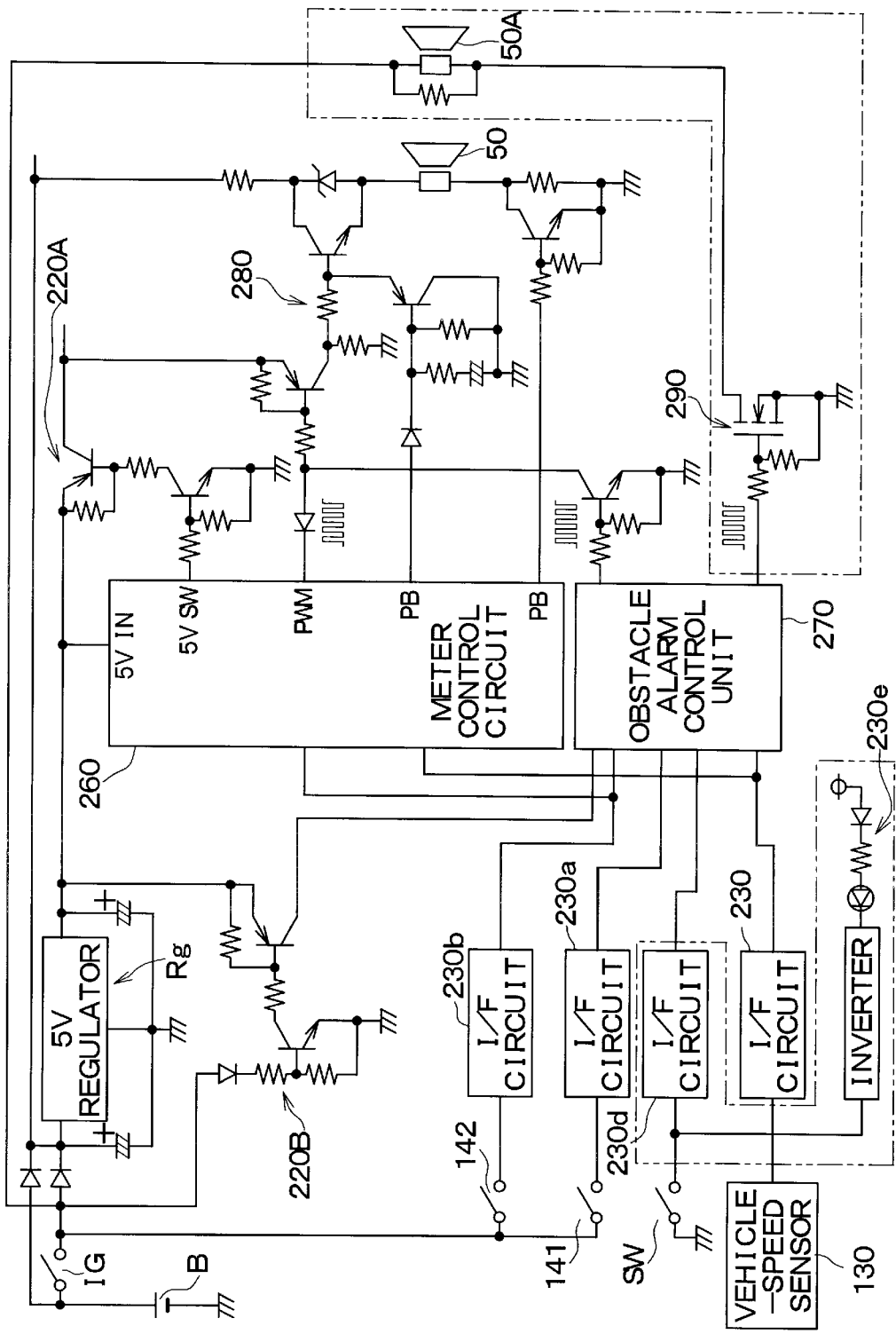
FIG. 18 is a block diagram showing a fifth embodiment of the present invention.

FIG. 18 shows a fifth embodiment of the present invention. The fifth embodiment is different from the third embodiment in that one of the two obstacle sensors 30*a* described in the third embodiment (see FIG. 12) is not adopted and the other obstacle sensor 30*a* is installed at the center of the front bumper of the vehicle in its left-to-right direction. Therefore, as the disposition of the obstacle sensor of the fifth embodiment, two obstacle sensors 30 are disposed at the rear part of the vehicle and one obstacle sensor 30*a* is disposed at the front part of the vehicle.

In the fifth embodiment, 5V power sources 220A and 220B are adopted as a replacement for the 5V power source 220 described in the third embodiment. The 5V power source 220A generates a constant voltage for a meter of 5V in cooperation with a 5V-regulator Rg to which an electric power is supplied from the battery B. The 5V power source 220B generates a constant voltage for an obstacle alarm device of 5V in cooperation with the 5V-regulator Rg to which an electric power is supplied from the battery B. The 5V power source 220*b* described in the third embodiment is not adopted in the fifth embodiment.

In the fifth embodiment, a meter control circuit 260, a obstacle alarm control unit 270, and a buzzer-driving circuit 280 correspond to the meter control circuit 10, the obstacle alarm device control circuit 20A, and the buzzer-driving circuit 40, respectively. In the fifth embodiment, the buzzer 50 described in the third embodiment is used as an obstacle-alarming means for giving an alarm about an obstacle present rearward from the vehicle.

A buzzer 50A and a buzzer-driving circuit 290 are used as an obstacle-alarming means for giving an alarm about an obstacle present forward from the vehicle. A main switch SW is an operation switch for selecting the construction (construction of obstacle sensor for use in circuit including both circuits surrounded with two-dot chain lines in FIG. 18) in which two obstacle sensors 30 are disposed in the rear part of the vehicle and one obstacle sensor 30*a* is disposed in the front part thereof or the construction (construction of obstacle sensor for use in circuit excluding both circuits surrounded with two-dot chain lines in FIG. 18) in which the two obstacle sensors 30 are disposed in the rear part of the vehicle and the obstacle sensor 30*a* is not adopted. In cooperation with an inversion circuit 230*e*, an I/F circuit 230*d* applies an output of the main switch SW to the obstacle alarm control unit 270. The other constructions of the fifth embodiment are substantially similar to those of the third embodiment.

In the fifth embodiment constructed as described above, the main switch SW, the I/F circuit 230*d*, and the inversion circuit 230*e* are additionally adopted. Thereby, by selecting the construction of the obstacle sensor for use in the circuit including both circuits surrounded with the two-dot chain lines in FIG. 18 or the construction of the obstacle sensor for use in the circuit excluding both circuits surrounded with the two-dot chain lines in FIG. 18 with the main switch SW, both buzzers 50 and 50A or only the buzzer 50 is sounded by the obstacle alarm control unit 270.

Consequently, irrespective of increase or decrease of the number of the obstacle sensors, it is possible for the meter and the obstacle alarm device to share the circuit construction other than both circuits surrounded with the two-dot chain lines in FIG. 18.

SIXTH EMBODIMENT

Figure 19:
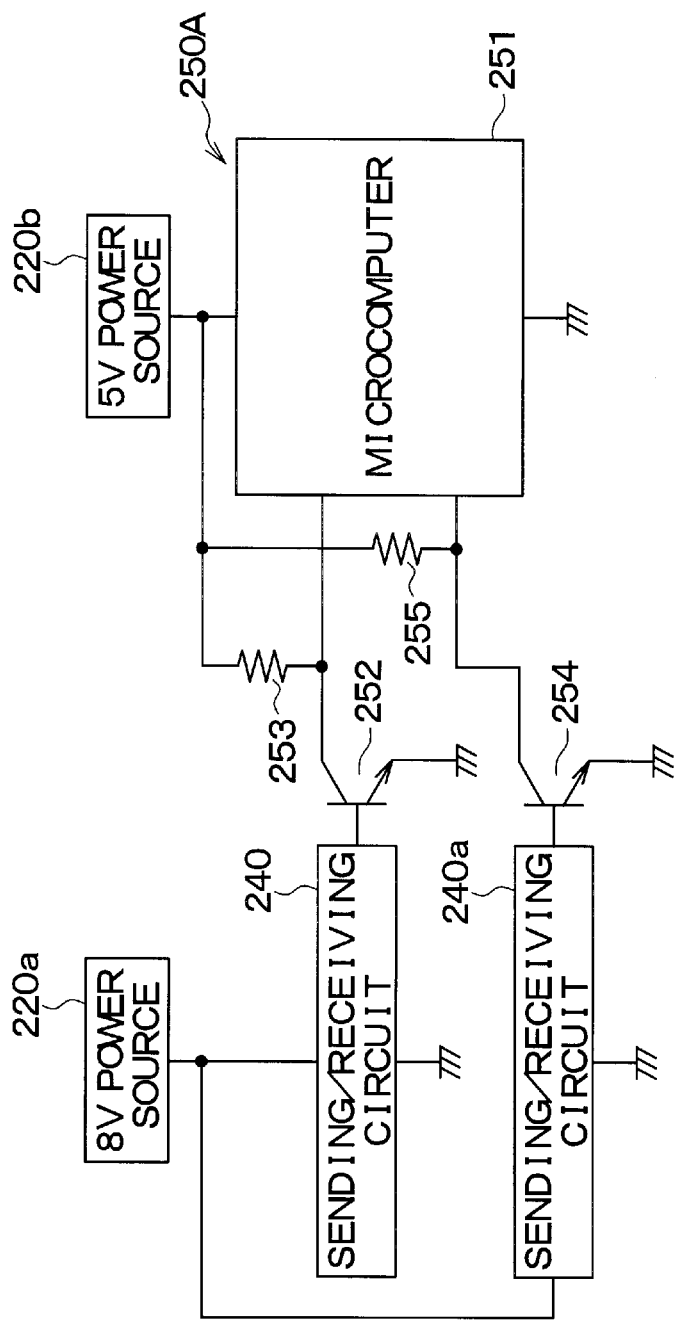
FIG. 19 is a block diagram showing main parts of a sixth embodiment of the present invention.

FIG. 19 shows a sixth embodiment of the present invention. In the sixth embodiment, a meter/obstacle alarm device control circuit 250A is adopted as a replacement for the meter/obstacle alarm device control circuit 250 (see FIG. 16) of the fourth embodiment. The meter/obstacle alarm device control circuit 250A has a microcomputer 251 which operates when a constant voltage of 5V is supplied to a power source terminal thereof from the 5V power source 220*b* shown in FIG. 16 and executes processing of the meter/ obstacle alarm device control circuit 250 in accordance with a flowchart of FIG. 17 described in the fourth embodiment.

The meter/obstacle alarm device control circuit 250A has both-open collector type transistors 252, 254 and resistances 253, 255. The base of the transistor 252 is connected to an output terminal of the sending/receiving circuit 240 (see FIGS. 16 and 19). The collector of the transistor 252 is connected to an output terminal of the 5V power source 220b through a resistance 253. The base of the transistor 254 is connected to an output terminal of the sending/receiving circuit 240a (see FIGS. 16 and 19). The collector of the transistor 254 is connected to the output terminal of the 5V power source 220b through a resistance 255. The other constructions of the sixth embodiment are similar to those of the fourth embodiment.

In the sixth embodiment constructed as described above, the 5V power source 220b and the 8V power source 220a operate simultaneously with ON of the ignition switch IG. The open collector type transistor 252 is connected between the sending/receiving circuit 240 and the microcomputer 251. Further, the open collector type transistor 254 is connected between the sending/receiving circuit 240a and the microcomputer 251. Thus, electric current based on the constant voltage of the 8V power source 220a does not flow through the 5V power source 220. The other operations and effects are similar to those of the fourth embodiment.

In carrying out the present invention in the third embodiment, the buzzer 50 may be sequentially sounded to give an alarm for abnormality of the obstacle detection function of the obstacle alarm device control circuit 20A, the approach of the vehicle to the obstacle present rearward from the vehicle, execution of speed-change processing of switching the speed-change range to the reverse range, and other reasons (for example, alarm of shortage of fuel).

By establishing priority among causes of the sounding of the buzzer 50 and sounding it in accordance with the priority, it is possible to prevent a driver of the vehicle from making an erroneous determination of the reason for the sounding of the buzzer 50 in the case where the function of the obstacle alarm device is adopted in the function of the meter.

In carrying out the present invention, the present invention is not limited to an automobile and may be applicable to various vehicles such as buses and the like.

What is claimed is:

1. A composite apparatus for a vehicle comprising: a meter (10, 10a, 60, 70, 80, 90) and an obstacle alarm device (20, 21, 30, 30a, 240, 240a) combined with said meter in such a way that said obstacle alarm device and said meter share a power source means (220, 220a), an interface means (230 through 230b), a control means (10, 20, 20A), and an informing means, further comprising:
    a vehicle speed detection means (130) for detecting a speed of said vehicle and inputting data of a detected vehicle speed to said interface means; and
    a reverse range detection means (142) for detecting a reverse range of a speed-change gear mounted on said vehicle and inputting data of a detected reverse range to said interface means;
    said obstacle alarm device comprising an obstacle detection means (30) for detecting an approach of a rear part of said vehicle to an obstacle present rearward from said rear part of said vehicle,
    wherein said informing means is a sounding means (40, 50) provided on said meter; and
    upon receipt of electric power from said power source means, said control means sounds said sounding means, according to an output of said detected reverse range sent thereto from said interface means and according to one of an output of said detected vehicle speed sent thereto from said interface means and an output of said detected result sent thereto from said obstacle detection means.

2. The composite apparatus for a vehicle according to claim 1, wherein said sounding means includes a buzzer (50) and a buzzer-driving circuit (40), both of which are shared by said meter and said obstacle alarm device.

3. A composite apparatus for a vehicle comprising: a meter (10, 10a, 60, 70, 80, 90) and an obstacle alarm device (20, 21, 30, 30a, 240, 240a) combined with said meter in such a way that said meter and said obstacle alarm device share a power source means (220, 220a), an interface means (230 through 230b), a control means (10, 20, 20A), and an informing means, further comprising:
    a vehicle speed detection means (130) detecting a speed of said vehicle and inputting data of a detected vehicle speed to said interface means; and
    a travel range detection means (142, 144, 145, 146) for detecting a travel range of a speed-change gear mounted on said vehicle and inputting data of a detected travel range to said interface means,
    said obstacle alarm device comprising an obstacle detection means (30, 30a) for detecting an approach of said vehicle to an obstacle,
    wherein said informing means is a travel distance display means (90) provided on said meter; and
    upon receipt of electric power from said power source means, said control means issues an instruction of displaying a travel distance of said vehicle to said travel distance display means, according to an output of said vehicle speed sent thereto from said interface means, and issues an instruction of displaying an approach of said vehicle to said obstacle to said travel distance display means, according to an output of said vehicle speed sent thereto from said interface means and an output sent thereto from said obstacle detection means.

4. The composite apparatus for a vehicle according to claim 3, wherein said travel distance display means includes a liquid crystalline panel (91) and a liquid crystalline panel-driving circuit (92), both of which are shared by said meter and said obstacle alarm device.

5. A composite apparatus for a vehicle comprising: a meter (10, 10a, 60, 70, 80, 90) and an obstacle alarm device (20, 21, 30, 30a, 240, 240a) combined with said meter in such a way that said meter and said obstacle alarm device share a power source means (220, 220a), an interface means (230 through 230b), a control means (10, 20, 20A), and an informing means, further comprising:
    a vehicle speed detection means (130) for detecting a speed of said vehicle and inputting data of a detected vehicle speed to said interface means; and
    a travel range detection means (142, 144, 145, 146) for detecting a travel range including a reverse range of a speed-change gear mounted on said vehicle and inputting data of a detected travel range to said interface means,
    said obstacle alarm device comprising an obstacle detection means (30) for detecting an approach of a rear part of said vehicle to an obstacle present rearward from said rear part of said vehicle,
    wherein said informing means is a sounding means (40, 50) provided on said meter and a travel distance display means (90) provided thereon; and upon receipt of electric power from said power source means, said control means sounds said sounding means, according to an output of said detected reverse range sent thereto from said interface means and according to one of an output of said detected vehicle speed sent thereto from said interface means and an output of said detected result sent thereto from said obstacle detection means, and issues an instruction of displaying a travel distance of said vehicle to said travel distance display means, according to an output of said vehicle speed sent thereto from said interface means, and issues an instruction of displaying an approach of said vehicle to said obstacle to said travel distance display means, according to an output of said vehicle speed sent thereto from said interface means and an output sent thereto from said obstacle detection means.

6. The composite apparatus for a vehicle according to claim 5, wherein said sounding means includes a buzzer (50) and a buzzer-driving circuit (40), both of which are shared by said meter and said obstacle alarm device.

7. The composite apparatus for a vehicle according to claim 5, wherein said travel distance display means includes a liquid crystalline panel (91) and a liquid crystalline panel-driving circuit (92), both of which are shared by said meter and said obstacle alarm device.

8. A composite apparatus for a vehicle comprising:

a meter (10, 10a, 60, 70, 80, 90);

an obstacle alarm device (20, 21, 30, 30a, 240, 240a) combined with said meter in such a way that said obstacle alarm device and said meter share a power source (220, 220a), an interface (230 through 230b), a controller (10, 20, 20A), and a sound generator provided on said meter, said obstacle alarm device comprising an obstacle detector (30) for detecting an approach of a rear part of said vehicle to an obstacle present rearward from said rear part of said vehicle;

a vehicle speed detector (130) for detecting a speed of said vehicle and inputting data of a detected vehicle speed to said interface; and a reverse range detector (142) for detecting a reverse range of a speed-change gear mounted on said vehicle and inputting data of a detected reverse range to said interface, wherein upon receipt of electric power from said power source, said controller drives said sound generator according to an output of said detected reverse range sent thereto from said interface and according to one of an output of said detected vehicle speed sent thereto from said interface and an output of said detected result sent thereto from said obstacle detector.

* * * * *